(12) United States Patent
Tang et al.

(10) Patent No.: US 7,915,767 B2
(45) Date of Patent: Mar. 29, 2011

(54) LINEAR SYNCHRONOUS MOTOR

(75) Inventors: Yuqi Tang, Nagano (JP); Takashi Matsushita, Nagano (JP); Satoshi Sugita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 12/635,981

(22) Filed: Dec. 11, 2009

(65) Prior Publication Data

US 2010/0148595 A1   Jun. 17, 2010

(30) Foreign Application Priority Data

Dec. 11, 2008  (JP) ................................. 2008-315929
Sep. 11, 2009  (JP) ................................. 2009-211011
Nov. 30, 2009  (JP) ................................. 2009-272119

(51) Int. Cl.
    *H02K 41/02* (2006.01)
(52) U.S. Cl. ...................................... 310/12.18; 310/15
(58) Field of Classification Search .... 310/12.01–12.33, 310/15
See application file for complete search history.

(56) References Cited

U.S. PATENT DOCUMENTS

| | | | |
|---|---|---|---|
| 6,329,728 B1 * | 12/2001 | Kitazawa et al. | 310/14 |
| 7,378,763 B2 * | 5/2008 | Jack et al. | 310/12.06 |
| 7,501,724 B2 * | 3/2009 | Tang et al. | 310/12.19 |
| 2010/0033032 A1 * | 2/2010 | Tang et al. | 310/12.18 |

FOREIGN PATENT DOCUMENTS

JP    2001-286122    10/2001

* cited by examiner

*Primary Examiner* — Nguyen N Hanh
(74) *Attorney, Agent, or Firm* — Rankin, Hill & Clark LLP

(57) ABSTRACT

A linear synchronous motor, in which one or more intermediate annular magnetic pole portions and yoke assemblies can be connected easily while positioning the intermediate annular magnetic pole portions. A fitting concave portion that is opened in an axial direction and a direction away from a direct drive shaft is formed in each connected portion of the intermediate annular magnetic pole portions. A plurality of fitting grooves are formed on an outer peripheral surface of a pair of magnetic cylindrical members at a plurality of portions facing the plurality of intermediate annular magnetic pole portions. The intermediate annular magnetic pole portions are fixedly positioned between the pair of magnetic cylindrical members by fitting a peripheral portion defining the fitting concave portion of the intermediate annular magnetic pole portion into the corresponding fitting groove of the magnetic cylindrical member.

17 Claims, 27 Drawing Sheets

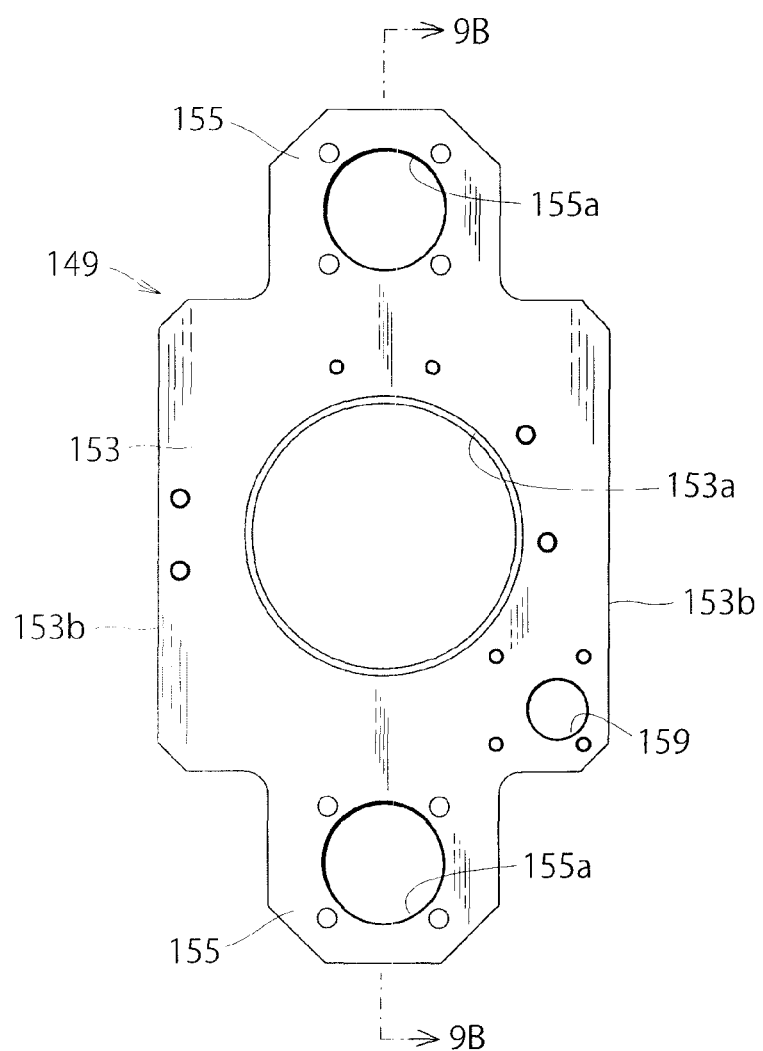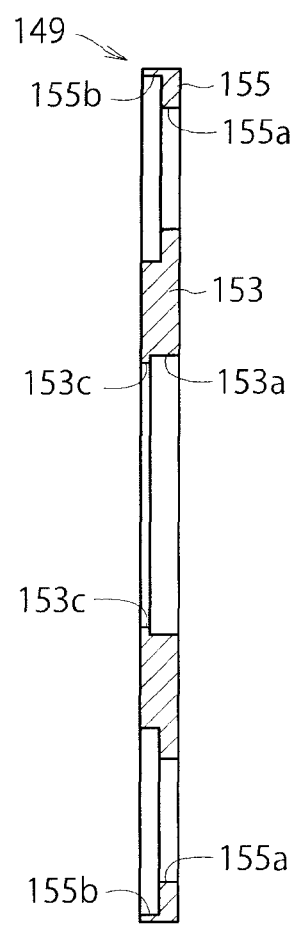

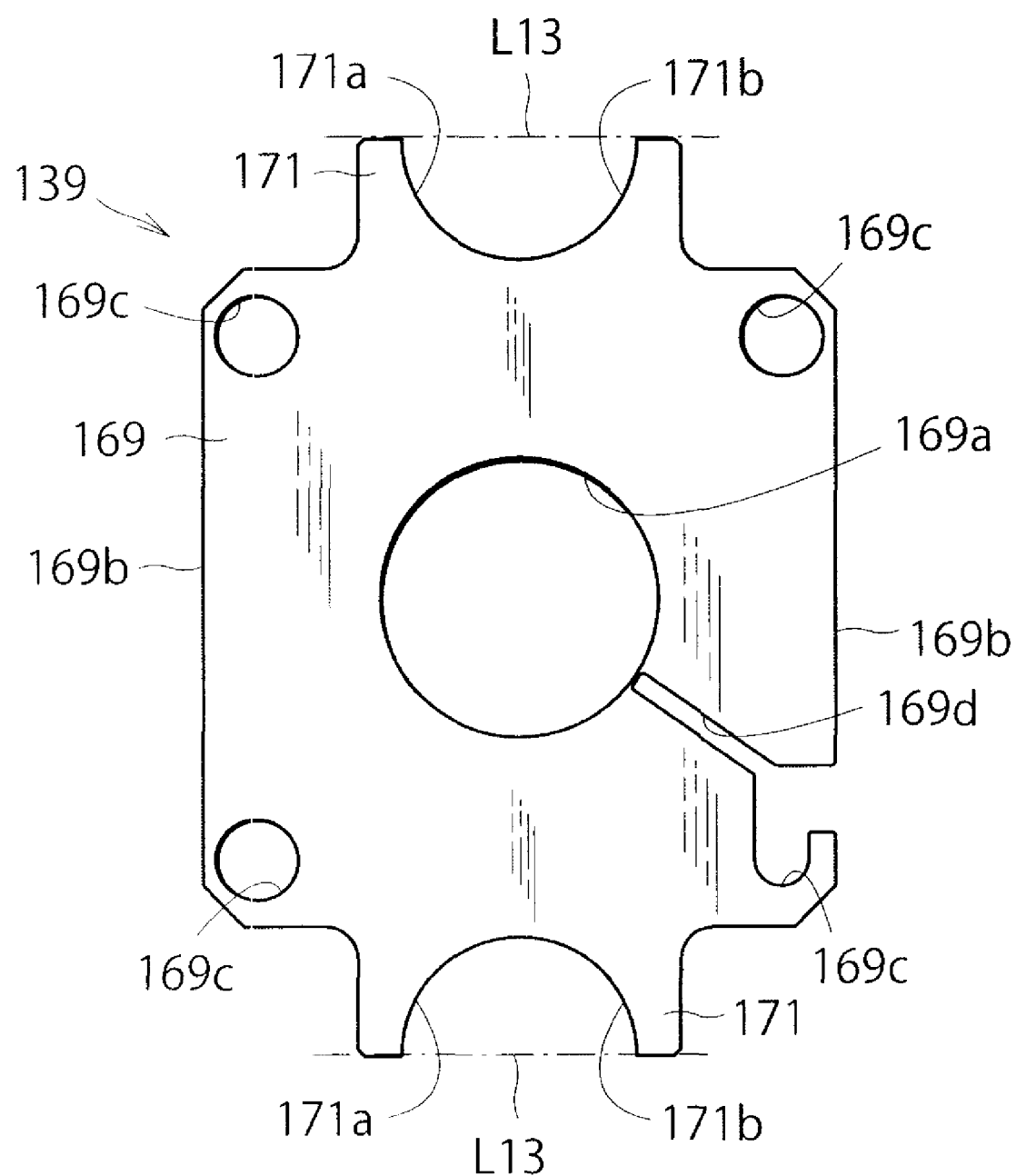

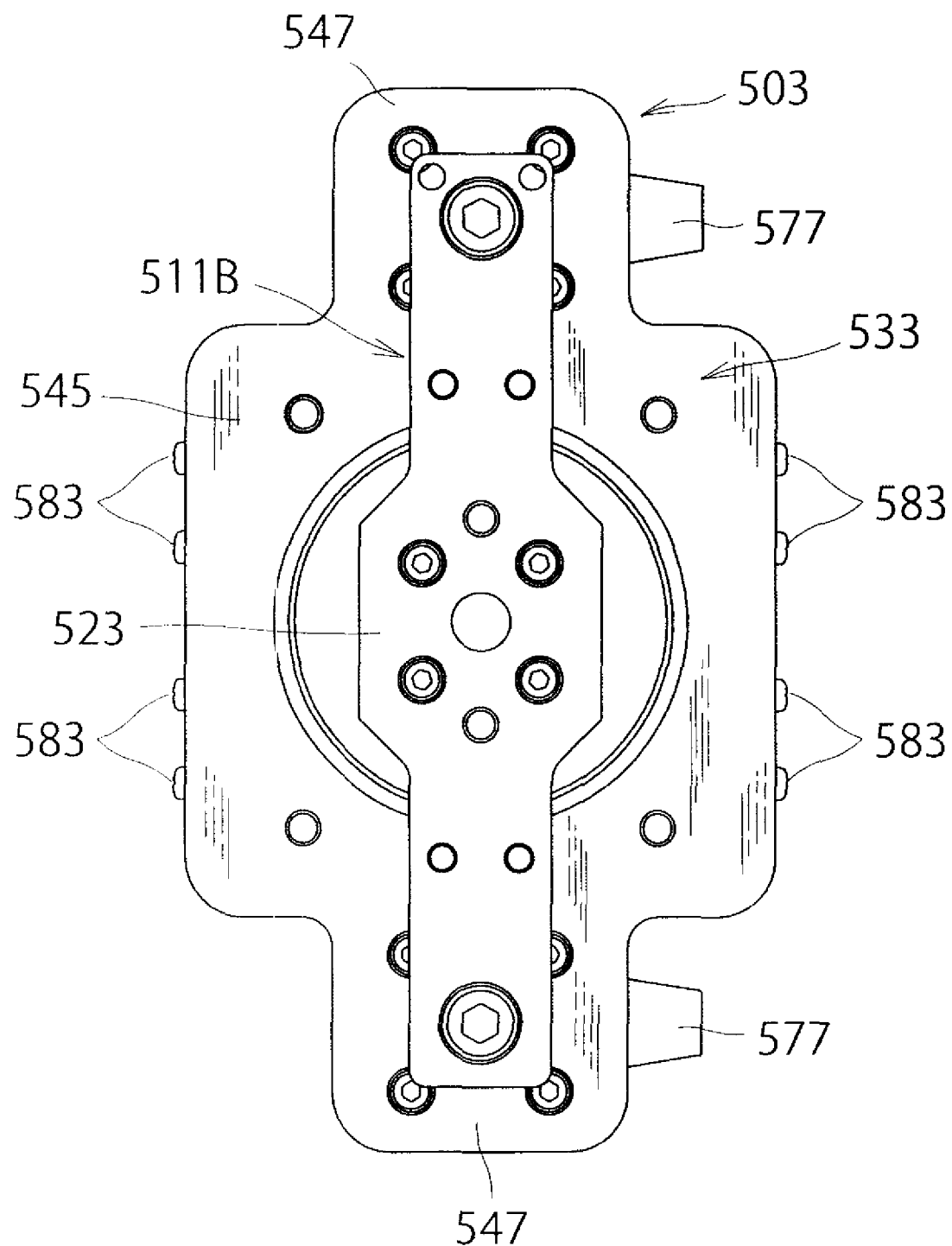

LINEAR SYNCHRONOUS MOTOR

TECHNICAL FIELD

The present invention relates to a linear synchronous motor in which a mover linearly moves relative to a stator.

BACKGROUND ART

Japanese Patent Application Publication No. 2001-286122 (JP2001-286122A) discloses a linear synchronous motor comprising a stator and a mover that linearly moves relative to the stator. The mover includes a direct drive shaft reciprocating in an axial direction and an array of permanent magnets or a permanent magnet array including a plurality of permanent magnets fixed to the direct drive shaft. The stator includes a plurality of annular windings and a stator core unit having formed a slot for receiving each of the plurality of annular windings. The annular windings are each formed of an annularly wound winding conductor and are disposed to enclose the mover. The stator core unit is constituted from a plurality of stator core divided bodies assembled with each other in the axial direction. The stator core divided bodies are formed by cutting work, and each include a magnetic pole portion facing the permanent magnet array of the mover and a yoke constituting portion which is combined with another stator core divided body to constitute a yoke magnetically connecting the magnetic pole portions. One annular winding is disposed between two adjacent magnetic pole portions.

Existing linear synchronous motors have an issue that the assembling of the stator core unit is complicated. To cope with the issue, a plurality of magnetic pole portions may be constituted from a pair of end annular magnetic pole portions located at axial ends and one or more intermediate annular magnetic pole portions located between the pair of end annular magnetic pole portions, and have a yoke assembly connected to the intermediate annular magnetic pole portions. However, it is complicated to connect the intermediate annular magnetic pole portions and the yoke assembly is complicated.

An object of the present invention is to provide a linear synchronous motor in which it is easy to connect an intermediate annular magnetic pole portion and a yoke assembly.

Another object of the present invention is to provide a linear synchronous motor in which positioning of intermediate annular magnetic pole portions may be determined.

Still another object of the present invention is to provide a linear synchronous motor in which an axial dimension of the linear synchronous motor may be reduced compared with the prior art and a lubricant applied to a linear bearing may be prevented from adhering to a magnetic pole surface of an annular magnetic pole portion or members around a direct drive shaft.

Yet another object of the present invention is to provide a linear synchronous motor in which molding process may be simplified, and heat of the motor may be dissipated through a peripheral wall portion.

Even another object of the present invention is to provide a linear synchronous motor for which it is not necessary to produce an end annular magnetic pole portion corresponding to a different model.

Still another object of the present invention is to provide a linear synchronous motor in which manufacturing cost of a stator may be reduced, and magnetic loss may be reduced, and iron loss may also be suppressed.

Yet another object of the present invention is to provide a linear synchronous motor in which generation of iron loss can be suppressed while maintaining an occupied volume of an excitation winding.

Even another object of the present invention is to provide a manufacturing method of a linear synchronous motor which does not need of providing a positioning means, such as a fitting structure, for positioning a plurality of annular magnetic pole portions in members of the motor.

SUMMARY OF INVENTION

A linear synchronous motor according to an embodiment of the present invention comprises a mover and a stator. The mover includes a direct drive shaft reciprocating in an axial direction and one or more permanent magnet arrays each including a plurality of permanent magnets mounted on the direct drive shaft. The stator includes a stator core unit and a plurality of excitation windings. The stator core unit includes a plurality of annular magnetic pole portions and a yoke. The annular magnetic pole portions are disposed concentrically with the direct drive shaft to enclose the direct drive shaft and also disposed at an interval in the axial direction. The annular magnetic pole portions each have a magnetic pole surface opposed to the permanent magnet arrays of the mover with a predetermined gap therebetween. The yoke magnetically connects the plurality of annular magnetic pole portions. The excitation windings excite the annular magnetic pole portions. The annular magnetic pole portions of the stator core unit each have a pair of connected portions, and are arranged such that the pairs of connected portions are disposed at a predetermined interval along the direct drive shaft to form a pair of connected portion arrays. The plurality of annular magnetic pole portions are constituted from a pair of end annular magnetic pole portions located at axial ends and one or more intermediate annular magnetic pole portions located between the pair of end annular magnetic pole portions. Each connected portion of the intermediate annular magnetic pole portion has formed therein a fitting concave portion that is opened in the axial direction and a direction away from the direct drive shaft. The yoke is made of a magnetic conductive material and includes a pair of yoke assemblies mechanically and magnetically connecting all of the connected portions of the pairs of connected portion arrays. The pair of yoke assemblies are in contact with the fitting concave portions at outer peripheral portions thereof. The term "magnetic conductive material" used herein refers to a material that may form a flux path.

According to an embodiment of the present invention, the connected portion of the intermediate annular magnetic pole portion includes a fitting concave portion that is opened in the axial direction and a direction away from the direct drive shaft, and the outer peripheral portions of the pair of yoke assemblies are in contact with the fitting concave portions. In this configuration, the intermediate annular magnetic pole portions and the yoke assembly may easily be connected, thereby simplifying manufacturing of linear synchronous motor.

The stator core unit may be configured so that a pair of linear bearings may be fixed thereto to face each other with respect to the direct drive shaft. Here, a pair of guide shafts are slidably supported by the linear bearings. One end of the direct drive shaft and ends of the pair of guide shafts located on the same axial end as the one end of the direct drive shaft are connected to a first connecting member, and the other end of the direct drive shaft and the other ends of the pair of guide shafts are connected to a second connecting member. The term "linear bearing" used herein refers to a bearing such as a linear guide, which supports a shaft to allow the shaft to reciprocate relative to a supported portion in the axial direction of the shaft. In this manner, the pair of linear bearings may fixedly locate the pair of guide shafts, which are facing each other with respect to the direct drive shaft, in a predetermined position. Since the pair of guide shafts connected with the first and second connecting members are supported by the pair of linear bearings, there is no need to support the direct drive shaft at both ends of the stator core unit. Accordingly, the length of the linear synchronous motor as measured in the axial direction may be reduced as compared with the prior art. Further, since the pair of guide shafts of the mover are slidably supported via the linear bearings in a position apart from the direct drive shaft, even if a lubricant is applied to the linear bearing that supports the mover, the lubricant does not adhere to the magnetic pole surface of the annular magnetic pole portion or members around the direct drive shaft.

One or more fitting grooves may be formed in an outer peripheral portion of each yoke assembly in the pair at one or more portions facing the one or more intermediate annular magnetic pole portions. A peripheral portion defining the fitting concave portion of the intermediate annular magnetic pole portion is fitted into the corresponding fitting groove of the yoke assembly to fixedly position the one or more intermediate annular magnetic pole portions between the pair of yoke assemblies. With this configuration, the intermediate annular magnetic pole portions and the yoke assembly may easily be connected while positioning the intermediate annular magnetic pole portion just by fitting the peripheral portion defining the fitting concave portion of the intermediate annular magnetic pole portion into the corresponding fitting groove of the yoke assembly. Thus, manufacturing of the linear synchronous motor is simplified.

The stator may further include a peripheral wall portion disposed across the pair of end annular magnetic pole portions to enclose the one or more intermediate annular magnetic pole portions and the plurality of excitation windings. In this case, a mold layer formed of an insulating molding resin may be disposed between adjacent two of the annular magnetic pole portions, and be located radially outside of the excitation windings. In this configuration, the molding resin may be applied directly to the peripheral wall portion to simplify a mold used. Further, heat of the motor may be dissipated through the peripheral wall portion.

The peripheral wall portion may include a plurality of peripheral wall portion constituting members connected by a connecting structure. Such configuration may simplify the shape of a peripheral wall portion constituting member to be used, and allows the peripheral wall portion to be formed easily at lower costs.

The peripheral wall portion constituting members may be made of a magnetic conductive material and may be connected by a connecting plate made of a magnetic conductive material. In this case, the pair of end annular magnetic pole portions and the one or more intermediate annular magnetic pole portions may be magnetically connected by means of overlapped portions between the peripheral wall portion constituting members and the connecting plate. In this configuration, the overlapped portions of the plurality of peripheral wall portion constituting members and the connecting plate may prevent magnetic saturation, and may be used as a yoke to magnetically connect the plurality of annular magnetic pole portions.

The connecting structure may be configured to connect the plurality of peripheral wall portion constituting members and the stator core unit with screws. This configuration simplifies the attachment of the peripheral wall portion to the stator core unit.

The plurality of annular magnetic pole portions may each include a pair of auxiliary connected portions disposed along the direct drive shaft to form a pair of auxiliary connected portion arrays in addition to the pair of connected portions. In this case, the stator may further include a pair of magnetic conductive plates disposed corresponding to the pair of auxiliary connected portion arrays. The pair of magnetic conductive plates may be connected to the auxiliary connected portions constituting the pair of auxiliary connected portion arrays. With such configuration, the plurality of annular magnetic pole portions are connected to the yoke not only via the pair of connected portion arrays but also via the pair of auxiliary connected portion arrays.

The pair of yoke assemblies may be constituted from a pair of magnetic cylindrical members that connect the plurality of connected portions constituting the pair of connected portion arrays, and the linear bearing may be disposed in each magnetic cylindrical member in the pair. This configuration allows the pair of magnetic cylindrical members that connect the plurality of connected portions to support the pair of guide shafts. Thus, the pair of magnetic cylindrical members serve both as a yoke and a supporting member for supporting the guide shafts. Therefore, the number of parts for supporting the pair of guide shafts may be reduced.

The magnetic pole surface of each end annular magnetic pole portion in the pair is sloped such that a gap between the magnetic pole surface and the permanent magnet array becomes larger in the axial direction away from the intermediate magnetic pole portion adjacent to the end annular magnetic pole portion, thereby reducing cogging torque. In this case, the magnetic pole surface of each end annular magnetic pole portion in the pair, which is made of an integrally molded member, may be sloped. Alternatively, the end annular magnetic pole portion may include a magnetic pole body portion and an annular magnetic pole surface constituting portion such that the magnetic pole body portion has a through-hole in the center thereof and is connected to the pair of yoke assemblies, and the annular magnetic pole surface constituting portion includes the magnetic pole surface and is disposed in the through-hole. With such configuration, various kinds of magnetic pole surface constituting portions having a differently sloped magnetic pole surface may be selectively mounted onto the magnetic pole body portion according to specifications of linear synchronous motors. Thus, it is not necessary to specially prepare end annular magnetic pole portions according to different models.

The fitting concave portion may include at least partially a circular arc-shaped portion. For example, it may be a partially semi-circular shape, a semicircular shape, a semicircular shape plus straight portions extended from both ends thereof, and so on. Such shape of the fitting concave portion allows easy fitting of the peripheral portion defining the fitting concave portion of the intermediate annular magnetic pole portion into the fitting groove of the yoke assembly, thereby securing the connection between the intermediate annular magnetic pole portion and the yoke assembly.

According to an embodiment of the present invention, since the annular magnetic pole portions and the yoke assemblies are manufactured separately, the one or more intermediate annular magnetic pole portions may be formed by stacking a plurality of magnetic steel plates of a predetermined shape in the axial direction. Thus, manufacturing cost of the stator may be reduced compared with the prior art in which all of the annular magnetic pole portions are each formed by cutting a magnetic material. Further, magnetic loss and iron loss generated in the stator core unit may be reduced.

Usually, the excitation windings are each received in a bobbin made of an insulating material for insulating the excitation windings and the annular magnetic pole portions. In this case, it is preferred that the bobbin receiving the excitation winding therein be shaped and dimensioned to be inserted between adjacent two of the intermediate annular magnetic pole portions, after the one or more intermediate annular magnetic pole portions have fixedly been positioned, for example, by using jigs or with the yoke assemblies. With such configuration, the bobbin receiving therein the excitation winding may be easily mounted in a predetermined space between adjacent two of the intermediate annular magnetic pole portions with the intermediate annular magnetic pole portions being fixedly positioned.

The bobbin may be configured to include a cylindrical portion through which the direct drive shaft passes in a center portion thereof and a pair of flange portions integrally disposed at both ends of the cylindrical portion and extending in a direction perpendicular to the axial direction. In this case, it is preferred that at least one flange portion in the pair includes a slot portion radially extending to lead out a lead wire of the excitation winding radially outside of the flange portion of the bobbin, and the at least one flange portion in the pair integrally includes a protruding portion protruding in a direction away from the other flange portion in the pair and having formed therein the slot portion. Then, the intermediate annular magnetic pole portion may have a through-hole through which the direct drive shaft passes and a protruding portion fitting groove which is fitted with the protruding portion of the bobbin. With such configuration, the lead wire may be disposed outside of a region surrounded by the pair of flange portions and the cylindrical portion for receiving the excitation winding, by putting the lead wire of incoming exciting winding into the protruding portion. Thus, iron loss may be suppressed while maintaining the occupied volume of the excitation winding.

In manufacturing the linear synchronous motor according to an embodiment of the present invention, first, a positioning jig is prepared for positioning the plurality of annular magnetic pole portions to form the pair of connected portion arrays is prepared. The positioning jig includes a base on which the plurality of annular magnetic pole portions are mounted and a spacer projecting from the base for spacing out adjacent two of the annular magnetic pole portions. Subsequently, the plurality of annular magnetic pole portions are mounted on the base and each of the excitation windings is inserted between two adjacent annular magnetic pole portions to combine the plurality of annular magnetic pole portions and the plurality of excitation windings. In this manner, positioning of the plurality of annular magnetic pole portions may be carried out by means of the positioning jig. Thus, it is not necessary to provide any motor member with a positioning means, such as a fitting structure, for positioning the plurality of annular magnetic pole portions.

BRIEF DESCRIPTION OF DRAWINGS

FIG. 9A is a plan view of a magnetic pole body portion of one end annular magnetic pole portion used in the stator of FIG. 4, and FIG. 9B is a sectional view taken along line B-B of FIG. 9A.

FIG. 13 is a plan view of an intermediate annular magnetic pole portion used in the stator of FIG. 4.

FIG. 27 is a left side view of the linear synchronous motor of FIG. 25.

DESCRIPTION OF EMBODIMENTS

Figure 1:
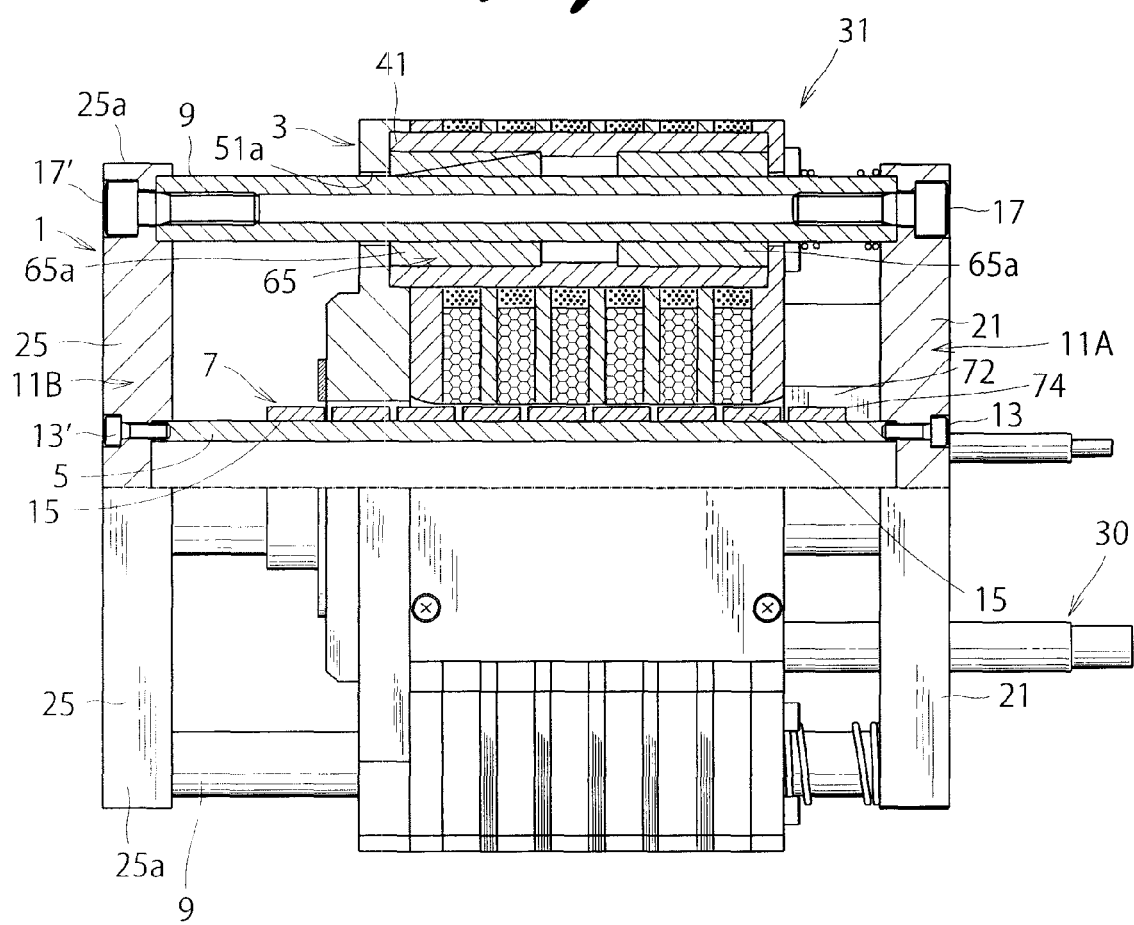
FIG. 1 is a partially cut-away front view of a linear synchronous motor according to an embodiment of prior art, which has been proposed by the same inventor as the present invention and forms a basis for the present invention.
Figure 2:
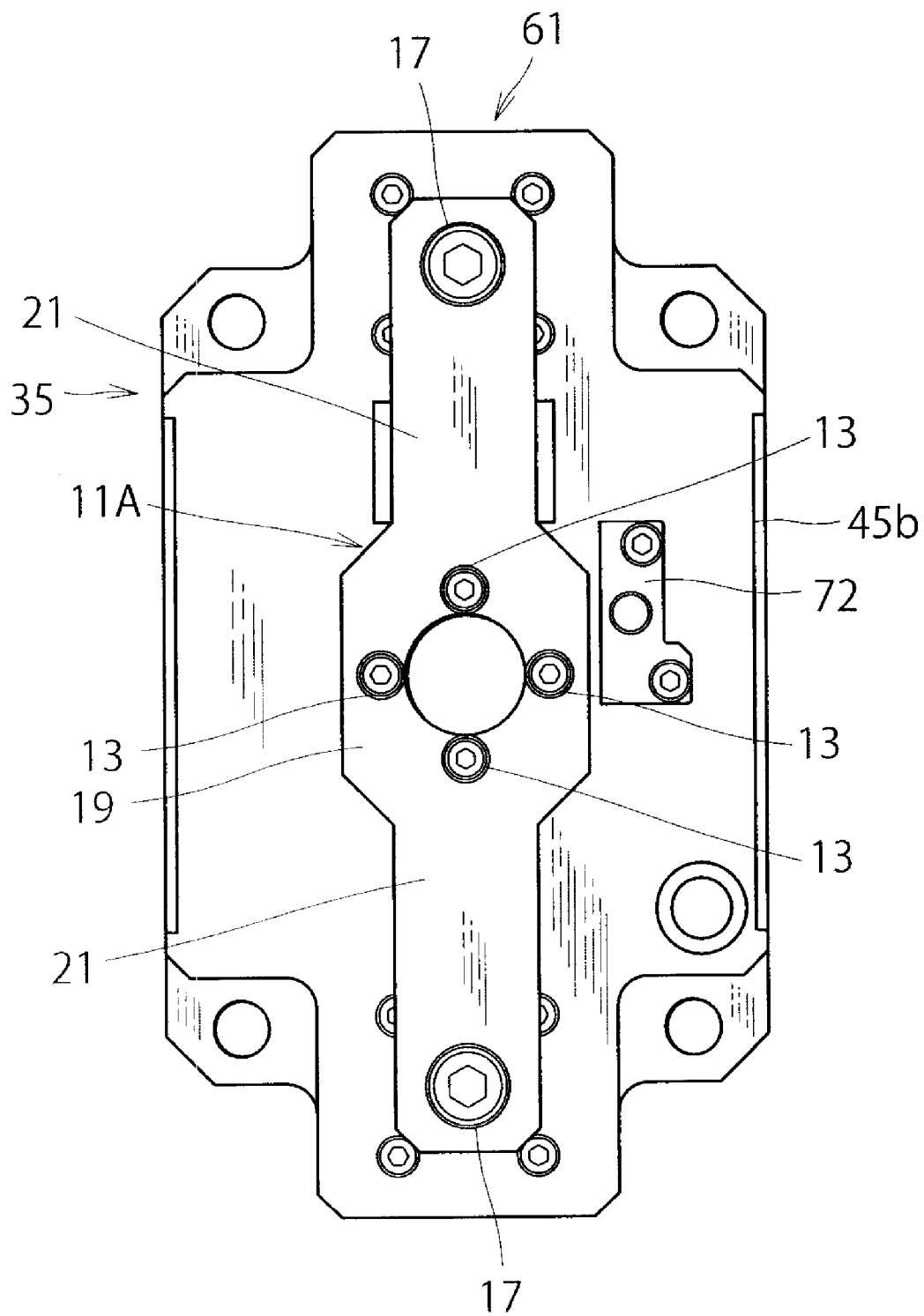
FIG. 2 is a right side view of the linear synchronous motor of FIG. 1.
Figure 3:
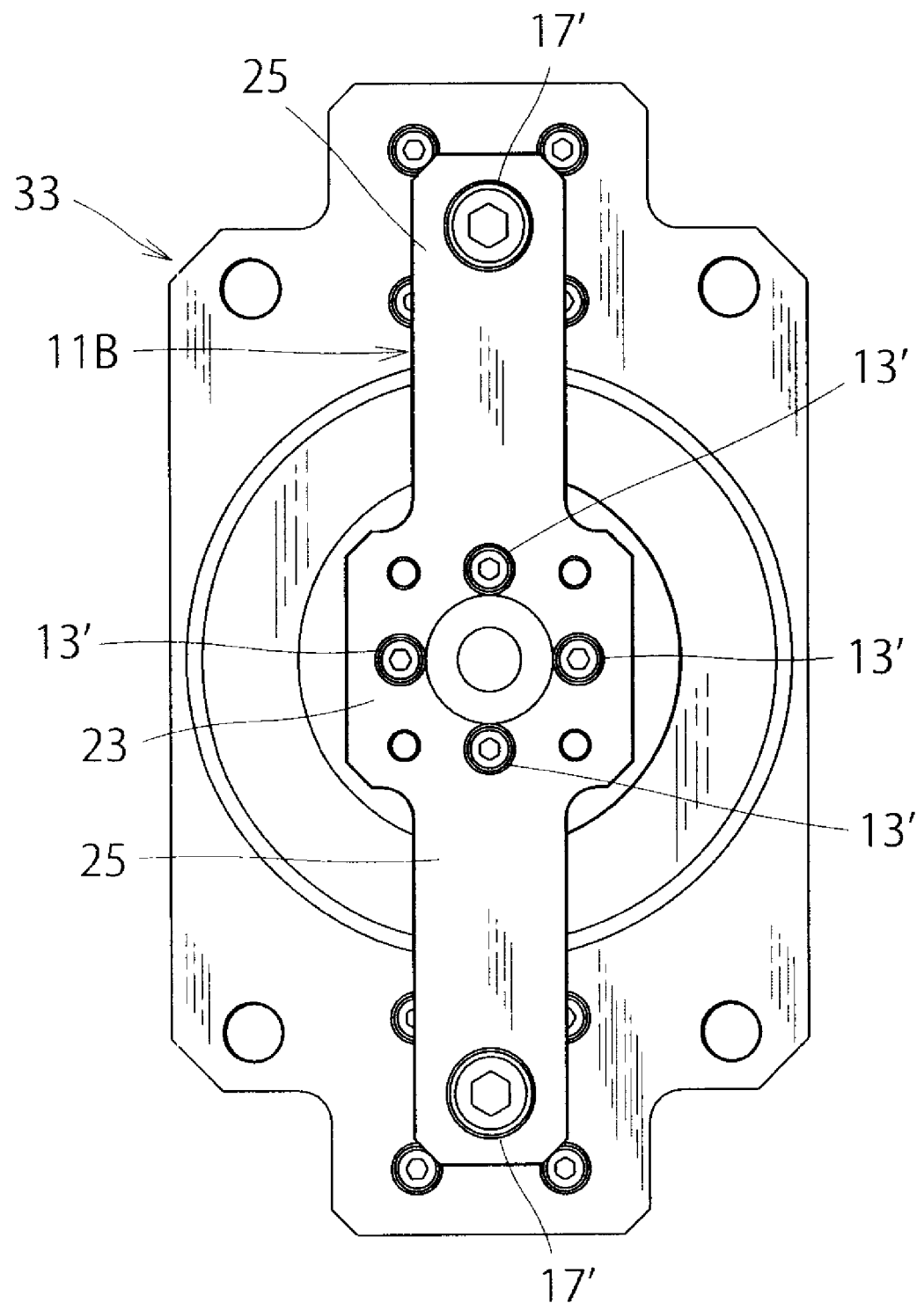
FIG. 3 is a left side view of the linear synchronous motor of FIG. 1.

Embodiments of the present invention will now be described in detail hereinbelow. FIGS. 1, 2, and 3 are respectively a front view, a right side view and a left side view of a linear synchronous motor according to an embodiment of prior art, which has been proposed by the same applicant as the present invention and forms a basis for developing a linear synchronous motor of the present invention. FIG. 1 shows the linear synchronous motor that has partially been cut-away for clarity in the angular range of 90° about the axial line of a direct drive shaft 5. As shown in FIG. 1, the linear synchronous motor comprises a mover 1 and a stator 3. The mover 1 includes a direct drive shaft 5, a permanent magnet array 7, a pair of guide shafts 9, a pair of connecting members 11A and 11B, and a permanent magnet 74 to be detected. As shown in FIGS. 1 and 2, a Hall element 72 is disposed on a stator core unit 31. The permanent magnet 74 to be detected is disposed on the direct drive shaft 5 to face the Hall element 72. The Hall element 72 and the permanent magnet 74 to be detected work together to detect magnetic poles. The direct drive shaft 5 has an elongated cylindrical shape and is configured to reciprocate in the axial direction thereof. The permanent magnet array 7 is constituted from eight circular annular permanent magnets 15 fitted with an outer periphery of the direct drive shaft 5 and arranged in the axial direction of the direct drive shaft 5. Four circular annular permanent magnets 15 among the eight permanent magnets 15 are magnetized such that N-pole appears on a radially outer surface of the direct drive shaft 5, and the other four circular annular permanent magnets 15 are magnetized such that S-pole appears on the radially outer surface of the direct drive shaft 5. The eight permanent magnets 15 are arranged such that the N-pole and the S-pole alternately appear in the axial direction. In the present embodiment, one permanent magnet 15 is constituted from six circular arc-shaped permanent magnet pieces arranged in a peripheral direction of the direct drive shaft 5. The permanent magnet pieces are fixed to the direct drive shaft 5 by an adhesive. Alternatively, a heat shrinkable tube may cover an outer periphery of the direct drive shaft 5 on which the eight permanent magnets 15 have been mounted and be heated to be shrunk for entirely wrapping the permanent magnets 15. The permanent magnets 15 may be mounted directly on the outer periphery of the direct drive shaft 5 as with this embodiment, or may be mounted indirectly thereon. For example, a magnet mounting portion may be fixed to the outer periphery of the direct drive shaft 5 for fixing the permanent magnet array (plurality of permanent magnets) onto the magnet mounting portion.

The pair of guide shafts 9 each have an elongated cylindrical shape. The pair of guide shafts 9 are disposed to extend in parallel to the direct drive shaft 5 and connected thereto via a first connecting member and a second connecting member 11A and 11B. Each guide shaft 9 in the pair is slidably supported by a linear bearing 65 provided in each magnetic cylindrical member 41 in the pair. Such supporting structure determines the position of the direct drive shaft 5 of the mover 1 to be positioned in the center of the stator 3.

As shown in FIG. 2, the first connecting member 11A integrally includes a center portion 19 and two rectangular extended portions 21 extending upward and downward from the center portion 19 on the paper of FIG. 2. One end portion of the direct drive shaft 5 is connected to the center portion 19 by four screws 13. End portions of the pair of guide shafts 9, located on one axial end, are connected to end portions of the two extended portions 21 by screws 17. As shown in FIG. 3, the second connecting member 11B integrally includes a center portion 23 and two rectangular extended portions 25 extending from the center portion 23 in the up/down direction on the paper of FIG. 3. The other end portion of the direct drive shaft 5 is connected to the center portion 23 by four screws 13'. The other end portions of the pair of guide shafts 9, located on the other axial end, are connected to end portions 25a of the two extended portions 25 by screws 17'.

Figure 4:
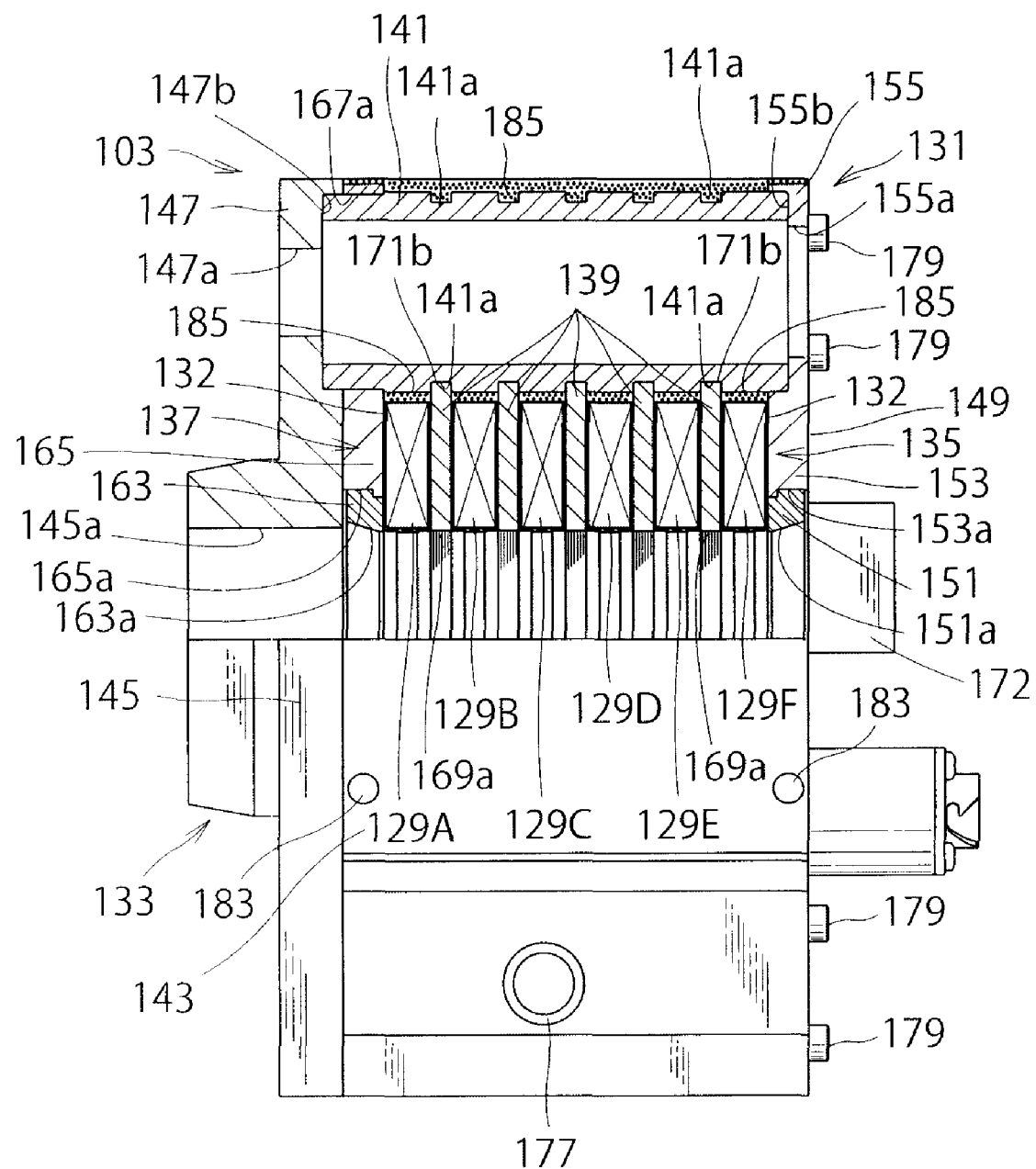
FIG. 4 is a partially cut-away front view of a stator used in a linear synchronous motor according to the present invention.
Figure 5:
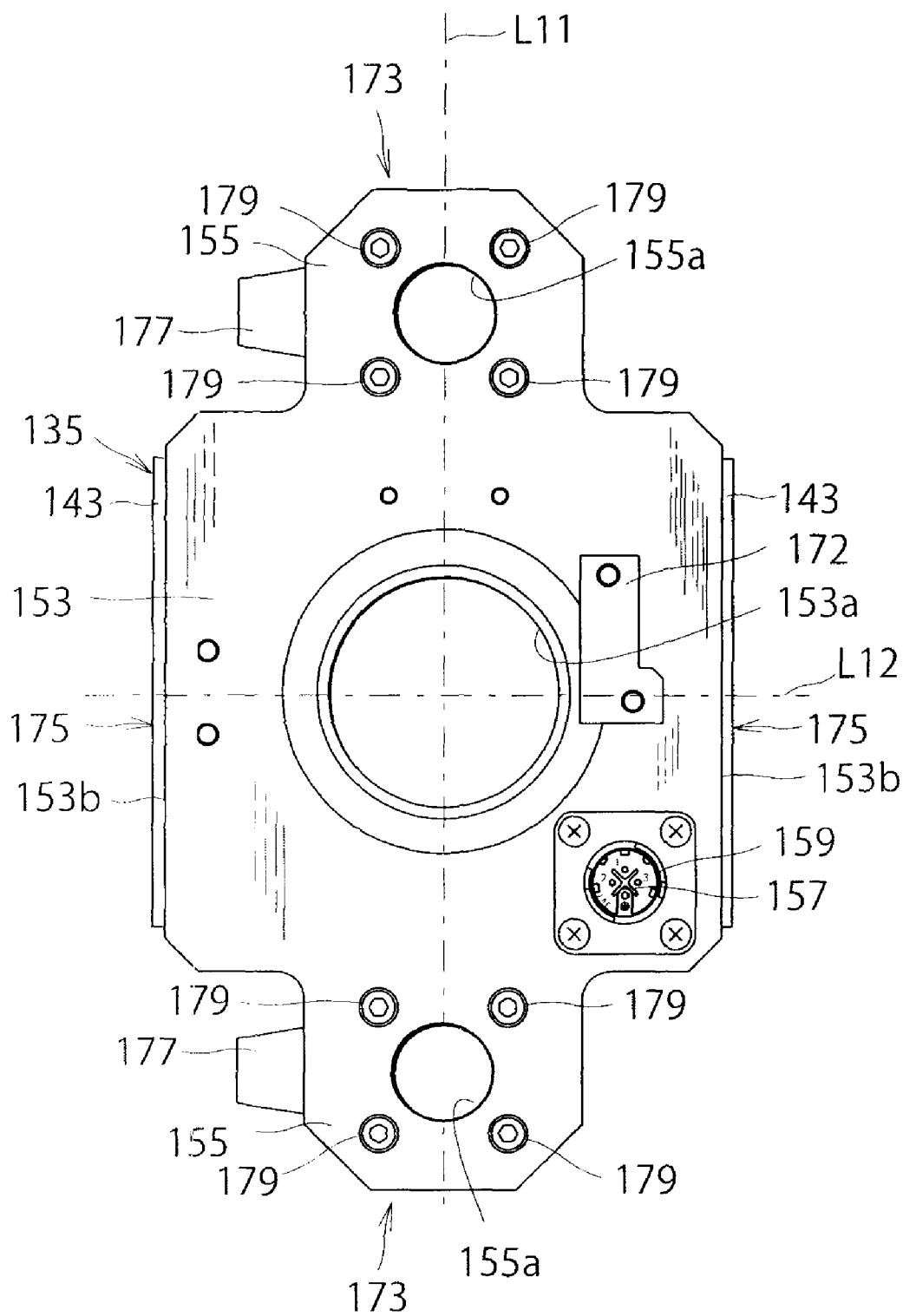
FIG. 5 is a right side view of the stator of FIG. 4.
Figure 6:
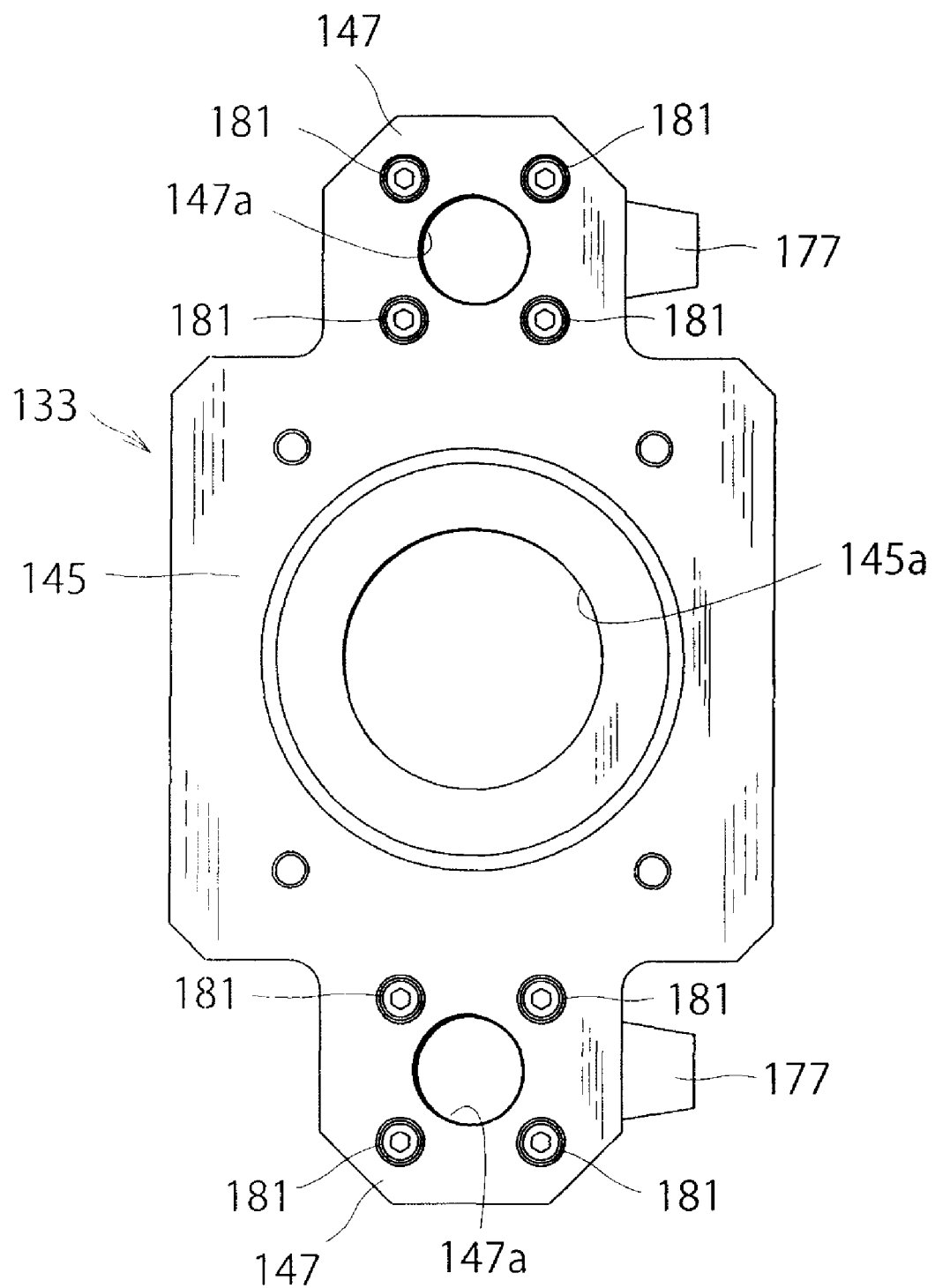
FIG. 6 is a left side view of the stator of FIG. 4.
Figure 7:
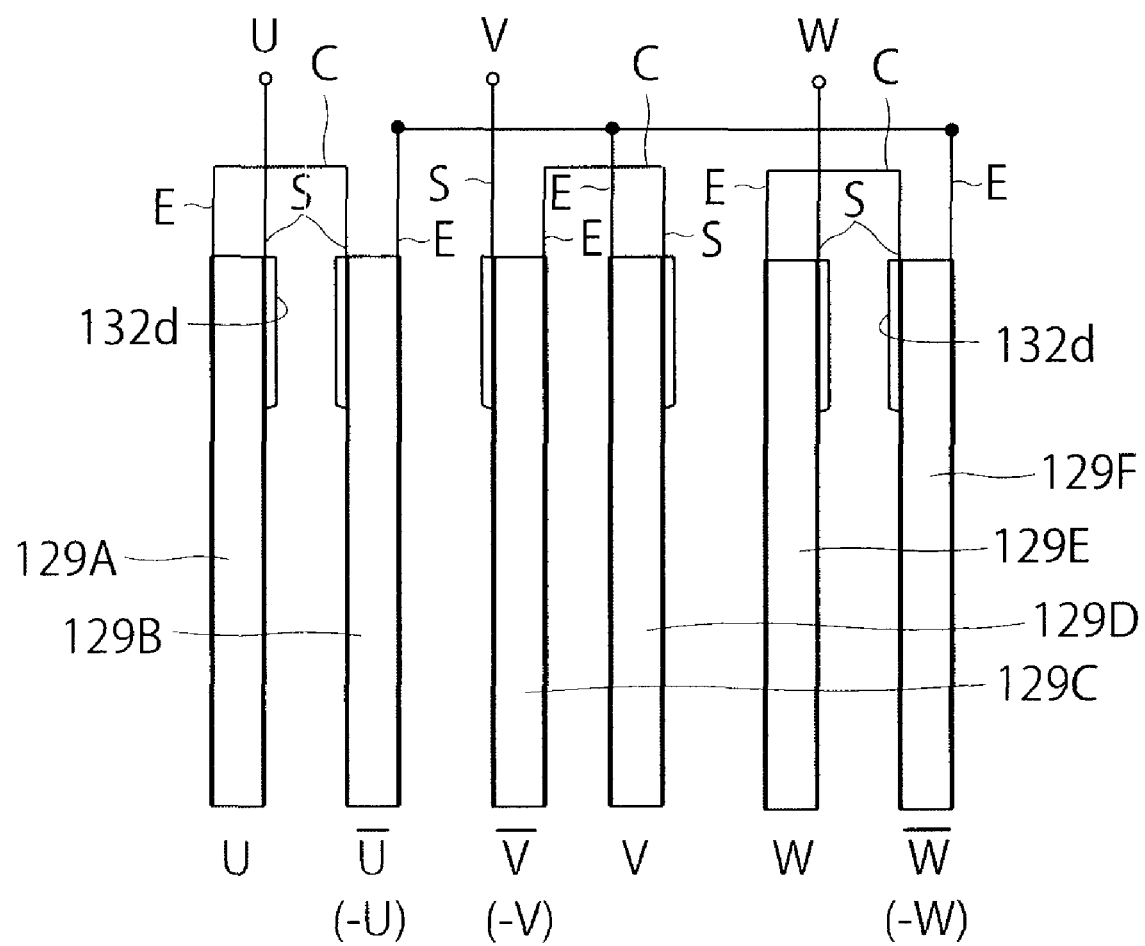
FIG. 7 is a wiring diagram of excitation windings of the stator illustrated in FIG. 4.
Figure 8A:
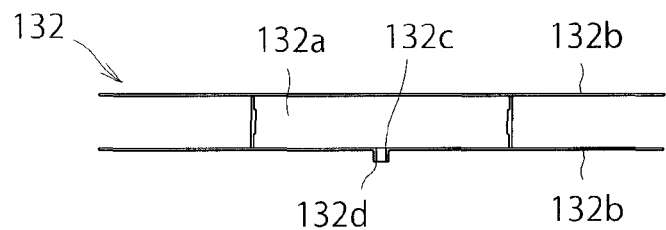
FIGS. 8A, 8B and 8C are respectively a plan view, a front view and a right side view of a bobbin used in the stator of FIG. 4.
Figure 8B:
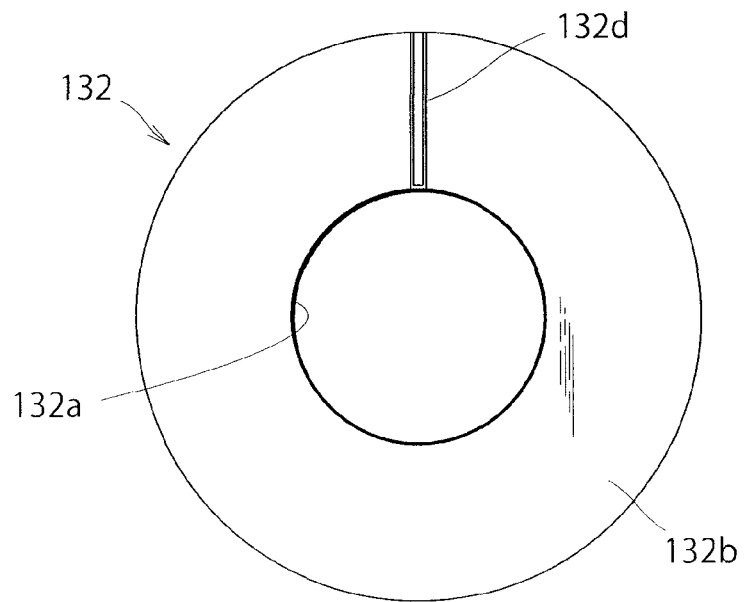
Figure 8C:
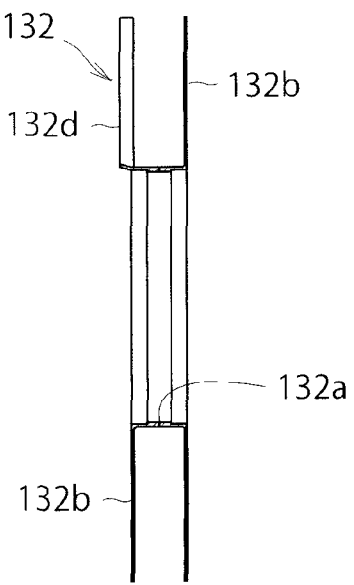

FIGS. 4 to 6 are respectively a front view, a right side view and a left side view of a stator 103 used in a linear synchronous motor according to an embodiment of the present invention. FIG. 4 is a partially cut-away view. Since the linear synchronous motor of the embodiment includes a mover configured similar to the linear synchronous motor illustrated in FIGS. 1 to 3, description of the mover will be omitted. The stator 103 of the linear synchronous motor according to the present embodiment includes six excitation windings 129A to 129F and a stator core unit 131. The six excitation windings 129A to 129F are each formed of an annularly wound winding conductor and disposed at a predetermined interval in the axial direction of the direct drive shaft 5 to enclose the periphery of the direct drive shaft 5. As shown in the wiring diagram of FIG. 7, three phases of excitation currents (U, V, W) mutually shifted by an electrical angle of 120° flow into the six excitation windings 129A to 129F. Specifically, excitation currents U and −U flow into the excitation windings 129A and 129B respectively, excitation currents −V and V flow into the excitation windings 129C and 129D respectively, and excitation currents W and −W flow into the excitation windings 129E and 129F respectively. In FIG. 7, the excitation windings 129A to 129F are schematically illustrated. The reference symbol "S" in FIG. 7 represents a starting end of a lead wire, and the reference symbol "E" represents an ending end of a lead wire. The excitation windings 129A to 129F are each received in a bobbin 132 illustrated in FIGS. 8A to 8C. The bobbin 132 is made of an insulating synthetic resin material insulating the excitation windings 129A to 129F from annular magnetic pole portions (135, 139, 137) to be described later. The bobbin 132 includes in the center portion thereof a cylindrical portion 132a through which the direct drive shaft 5 passes and a pair of flange portions 132b integrally provided at both ends of the cylindrical portion 132a to extend in a direction perpendicular to the axial direction of the direct drive shaft 5. One flange portion 132b in the pair includes a slot portion 132c radially extending to lead out the starting ends of the lead wires S (see FIG. 7) of the excitation windings (129A to 129F) radially outside of the flange portion 132b of the bobbin 132, and also integrally includes a protruding portion 132d protruding in a direction away from the other flange portion 132b in the pair and having formed therein the slot portion 132c. The starting ends of the lead wires S led out through the slot portion 132c are received in the protruding portion 132d. The bobbin 132 having received therein the excitation windings 129A to 129F is configured and dimensioned to be inserted between two adjacent annular magnetic pole portions (135, 139 and 137) after the five intermediate annular magnetic pole portions 139 to be described later have been fixedly positioned by means of jigs and with a pair of magnetic cylindrical member 141, etc.

Referring back to FIG. 4, the stator core unit 131 comprises an end bracket 133, the pair of end annular magnetic pole portions 135 and 137, five end annular magnetic pole portions 139, the pair of magnetic cylindrical members 141, and a magnetic conductive plate 143 made of a pair of magnetic conductive molded parts. As shown in FIG. 6, the end bracket 133 includes a substantially rectangular body portion 145 and a pair of connected portions 147 positioned above and below the body portion 145 on the paper of FIG. 6. The end bracket 133 is formed by cutting a non-magnetic material such as an aluminum plate. As shown in FIG. 4, a through-hole 145a, through which the direct drive shaft 5 passes, is formed in the center portion of the body portion 145. Accordingly, the pair of connected portions 147 face each other with respect to the direct drive shaft 5. A through-hole 147a, through which each guide shaft 9 in the pair passes, is formed in the center portion of each connected portion 147. An annular concave portion 147b is formed concentrically with the through-hole 147a in each connected portion 147 in the pair to open toward the end annular magnetic pole portion 137. The other end of each magnetic cylindrical member 141 in the pair is fitted into the concave portion 147b.

Figure 10A:
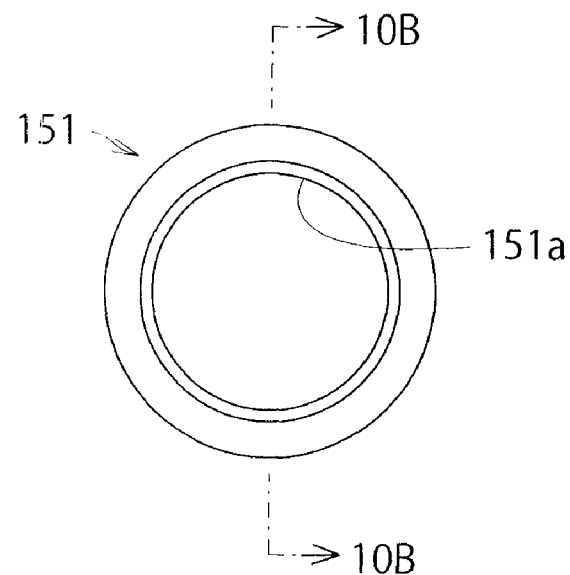
FIG. 10A is a plan view of a magnetic pole surface constituting portion of the one end annular magnetic pole portion used in the stator of FIG. 4.
Figure 10B:
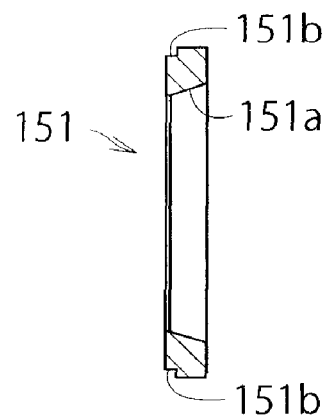
FIG. 10B is a sectional view taken along line B-B of FIG. 10A.

The end annular magnetic pole portion 135 of the pair of the end annular magnetic pole portions 135 and 137 includes a magnetic pole body portion 149 illustrated in FIGS. 9A and 9B and an annular magnetic pole surface constituting portion 151 illustrated in FIGS. 10A and 10B. The magnetic pole body portion 149 has a substantially rectangular body portion 153 and a pair of connected portions 155 positioned above and below the body portion 153 on the paper of FIGS. 9A and 9B, and is formed by cutting a magnetic steel plate having a predetermined thickness. A through-hole 153a, through which the direct drive shaft 5 passes, is formed in the center portion of the body portion 153. A pair of auxiliary connected portions 153b which are in contact with the pair of magnetic conductive plates 143 are formed on the right and left sides of the body portion 153 on the paper of FIG. 9A. As described above, the pair of connected portions 155 face each other with respect to the direct drive shaft 5, and the pair of auxiliary connected portions 153b also face each other with respect to the direct drive shaft 5. A through-hole 155a, through which each guide shaft 9 in the pair passes, is formed in the center portion of each connected portion 155 in the pair. An annular recess portion 155b is formed concentrically with the through-hole 155a in each connected portion 155 in the pair to open toward the end bracket 133. The other end of each magnetic cylindrical member 41 in the pair is fitted into the concave portion 155b. An annular protrusion 153c is formed on the body portion 153 on the side adjacent to the intermediate annular magnetic pole portion 39 to protrude into the through-hole 153a.

As shown in FIGS. 10A and 10B, the magnetic pole surface constituting portion 151 is an annular ring in shape and includes on its inner periphery a magnetic pole surface 151a. The magnetic pole surface 151a is sloped such that a gap between the magnetic pole surface 151a and the permanent magnet array 7 becomes larger in the axial direction away from the adjacent intermediate annular magnetic pole portions 139 in the axial direction of the direct drive shaft 5. A recess portion 151b, which is open toward the magnetic pole body portion 149 and the adjacent intermediate annular magnetic pole portion 139, is formed on the outer periphery of the annular magnetic pole surface constituting portion 151. The magnetic pole surface constituting portion 151 is disposed in the inside of the through-hole 153a of the body portion 153 with the protrusion 153c of the magnetic pole body portion 149 being fitted into the recess portion 151b of the magnetic pole surface constituting portion 151. As shown in FIG. 5, a through-hole 159 is formed in the end annular magnetic pole portion 135. A lead wire bundle 157, constituted by lead wires of excitation windings 129A to 129F arranged in a bundle, passes through the through-hole 159.

Figure 11A:
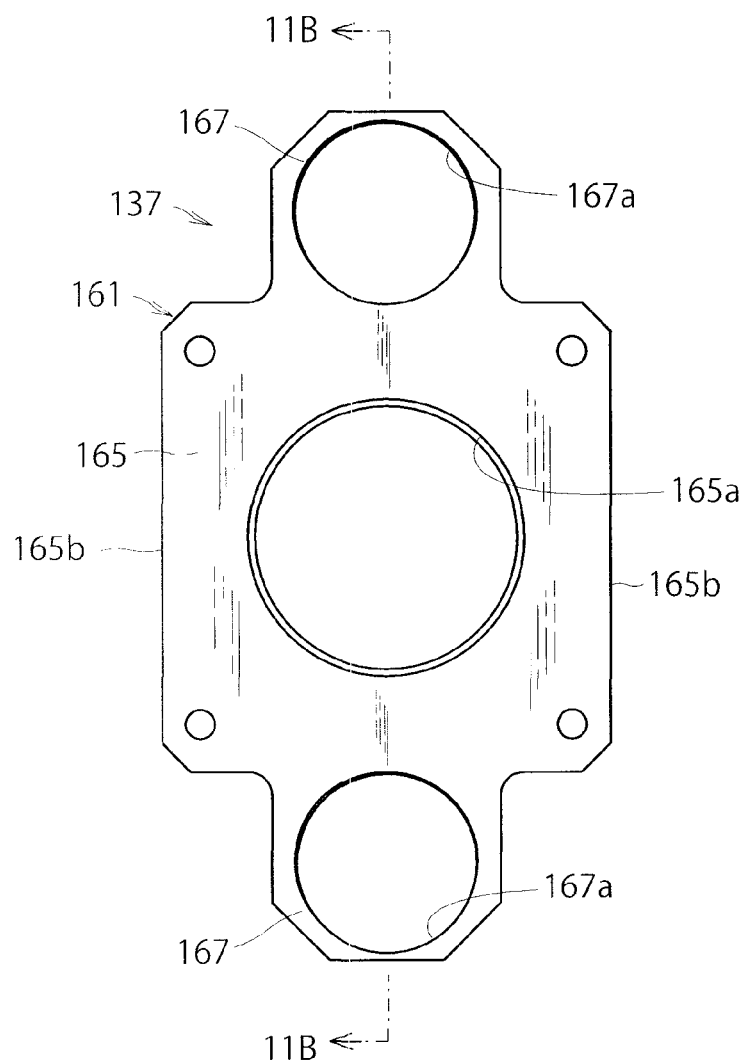
FIG. 11A is a plan view of a magnetic pole body portion of the other end annular magnetic pole portion used in the stator of FIG. 4.
Figure 11B:
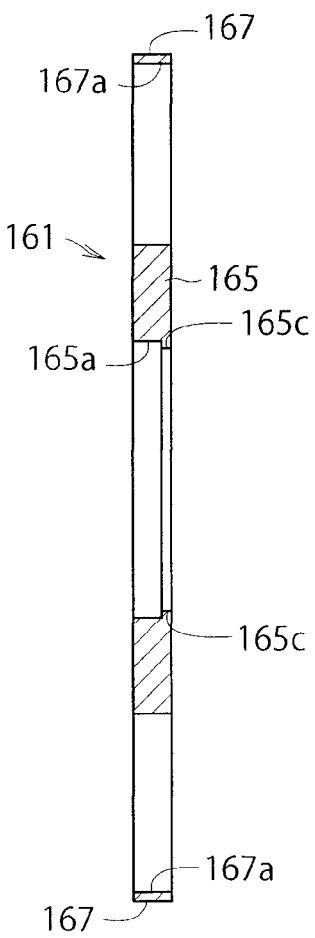
FIG. 11B is a sectional view taken along line B-B of FIG. 11A.
Figure 12A:
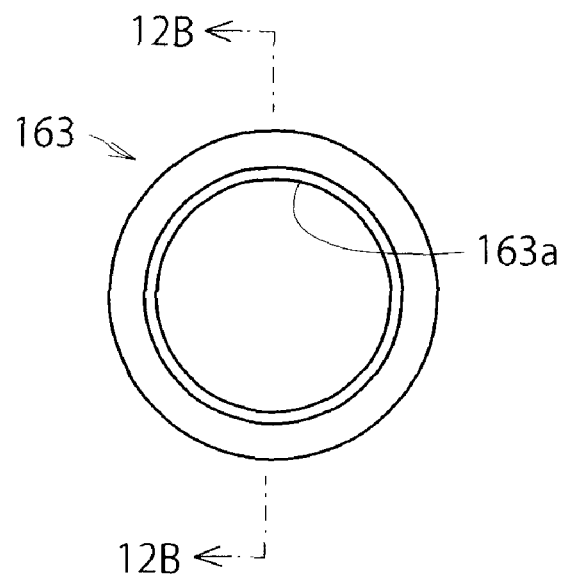
FIG. 12A is a plan view of a magnetic pole surface constituting portion of the other end annular magnetic pole portion used in the stator of FIG. 4.
Figure 12B:
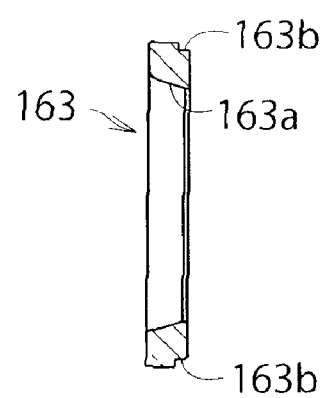
FIG. 12B is a sectional view taken along line B-B of FIG. 12A.

The end annular magnetic pole portion 137 (FIG. 4) adjoining the end bracket 133 includes a magnetic pole body portion 161 illustrated in FIGS. 11A and 11B and an annular magnetic pole surface constituting portion 163 illustrated in FIGS. 12A and 12B. The magnetic pole body portion 161 includes a substantially rectangular body portion 165 and a pair of connected portions 167 positioned above and below the body portion 165 on the paper of FIGS. 11A and 11B, and is formed by cutting magnetic steel having a predetermined thickness. A through-hole 165a through which the direct drive shaft 5 passes is formed in the center portion of the body portion 165. A pair of auxiliary connected portions 165b which are in contact with the pair of magnetic conductive plates 143 are formed on right and left sides of the body portion 165 on the paper of FIG. 11A. As described above, the pair of connected portions 167 face each other with respect to the direct drive shaft 5 and the pair of auxiliary connected portions 165b also face each other with respect to the direct drive shaft 5. A through-hole 167a through which the other end of each magnetic cylindrical member 141 in the pair passes is formed in the center portion of each connected portion 167 in the pair. An annular protrusion 165c is formed on an end portion of the body portion 165, the end portion being adjacent to the intermediate annular magnetic pole portion 139, to protrude into the through-hole 165a. As shown in FIGS. 12A and 12B, the magnetic pole surface constituting portion 163 is an annular ring in shape and includes on its inner periphery a magnetic pole surface 163a. The magnetic pole surface 163a is sloped such that a gap between the magnetic pole surface 163a and the permanent magnet array 7 becomes larger in the axial direction of the direct drive shaft 5 away from the adjacent intermediate annular magnetic pole portions 139. A recess portion 163b, which is opened toward the magnetic pole body portion 161 and the adjacent intermediate annular magnetic pole portions 139, is formed on the outer periphery of the annular magnetic pole surface constituting portion 163. The magnetic pole surface constituting portion 163 is disposed inside of the through-hole 165a of the body portion 165 with the protrusion 165c of the magnetic pole body portion 161 being fitted into the recess portion 163b of the magnetic pole surface constituting portion 163.

As shown in FIG. 13, each of the five intermediate annular magnetic pole portions 139 (FIG. 4) positioned between the end annular magnetic pole portion 135 and the end annular magnetic pole portion 137 include a rectangular body portion 169 and a pair of connected portions 171 positioned above and below the body portion 169 on the paper of FIG. 13. As shown in FIG. 4, the intermediate annular magnetic pole portions 139 are each formed by stacking a plurality of magnetic steel plates in the axial direction of the direct drive shaft 5. The five intermediate annular magnetic pole portions 139 are arranged in the axial direction of the direct drive shaft 5 between the end annular magnetic pole portion 135 and the end annular magnetic pole portion 137. A through-hole 169a, through which the direct drive shaft 5 passes, is formed in the center portion of the body portion 169. The inner peripheral surface of the through-hole 169a forms a magnetic pole surface which faces the permanent magnet array 7 of the mover 1 with a given gap therebetween. A pair of auxiliary connected portions 169b that are in contact with a pair of magnetic conductive plates 143 are formed on the right and left sides of the body portion 169 on the paper of FIG. 13. As described above, the pair of connected portions 171 face each other with respect to the direct drive shaft 5, and the pair of auxiliary connected portions 169b also face each other with respect to the direct drive shaft 5. Resin through-holes 169c are formed at four corners of the body portion 169. A protruding portion fitting groove 169d is formed between the through-hole 169a and one of the resin through-holes 169c. The protruding portion fitting groove 169d communicates with the one resin through-hole 169c. The protruding portion 132d of the bobbin 132 is fitted into the protruding portion fitting groove portion 169d.

The pair of connected portions 171 each include a fitting concave portion 171a which is opened in the axial direction and in a direction away from the direct drive shaft 5. The fitting concave portion 171a is semicircular in shape. A dashed-dotted line L13 of FIG. 13 is an imaginary line extending rightward and leftward on the paper of FIG. 13 passing through the center of an imaginary circle including a semicircle that defines the fitting concave portion 171a.

In the present embodiment, as shown in FIG. 4, the end annular magnetic pole portion 135, the five intermediate annular magnetic pole portions 139 and the end annular magnetic pole portion 137 are spaced from one another in the axial direction to form a space in which each excitation winding (129A to 129F) is disposed between adjacent two of the annular magnetic pole portions (135, 139 and 137).

With the end bracket 133, the end annular magnetic pole portions 135 and 137, the five intermediate annular magnetic pole portions 139 and the six excitation windings 129A to 129F being assembled together, the pair of connected portions 155 (see FIG. 5) of the end annular magnetic pole portion 135, the pair of connected portions 167 (see FIGS. 11A and 11B) of the end annular magnetic pole portion 137, and the pair of connected portions 171 (see FIG. 13) of the five intermediate annular magnetic pole portion 139 are arranged along the direct drive shaft 5 to constitute a pair of connected portion arrays 173 (extending, on the upper and lower portions of FIG. 5, in a direction perpendicular to the paper of FIG. 5). Further, the pair of auxiliary connected portions 153b (see FIG. 5) of the end annular magnetic pole portion 135, the pair of auxiliary connected portions 165b (see FIGS. 11A and 11B) of the end annular magnetic pole portion 137, and the pair of auxiliary connected portions 169b (see FIG. 13) of the five intermediate annular magnetic pole portions 139, are disposed along the direct drive shaft 5 to form a pair of auxiliary connected portion arrays 175 (extending, on the right and left portions of FIG. 5, in a direction perpendicular to the paper of FIG. 5) in addition to a pair of connected portions (155, 167, 171). The pair of connected portion arrays 173 exist on an imaginary line L11 extending upward and downward from the direct drive shaft 5 on the paper of FIG. 5. As a result, the pair of connected portion arrays 173 are positioned apart from each other by a mechanical angle of 180° relative to the direct drive shaft 5. The pair of auxiliary connected portion arrays 175 exist on an imaginary line L12 (perpendicular to the imaginary line L11) extending rightward and leftward from the direct drive shaft 5 on the paper of FIG. 5. As a result, the pair of auxiliary connected portion arrays 175 are positioned apart from each other by a mechanical angle of 180° relative to the direct drive shaft 5 and positioned apart from the pair of connected portion arrays 173 by a mechanical angle of 90°. The pairs of connected portions (155, 167, 171) forming the pair of connected portion arrays 173 are connected to one another by the pair of magnetic cylindrical members 141. The pairs of auxiliary connected portions (153b, 165b, 169b) forming the pair of auxiliary connected portion arrays 175 are connected to one another by the pair of magnetic conductive plates 143.

Figure 14A:
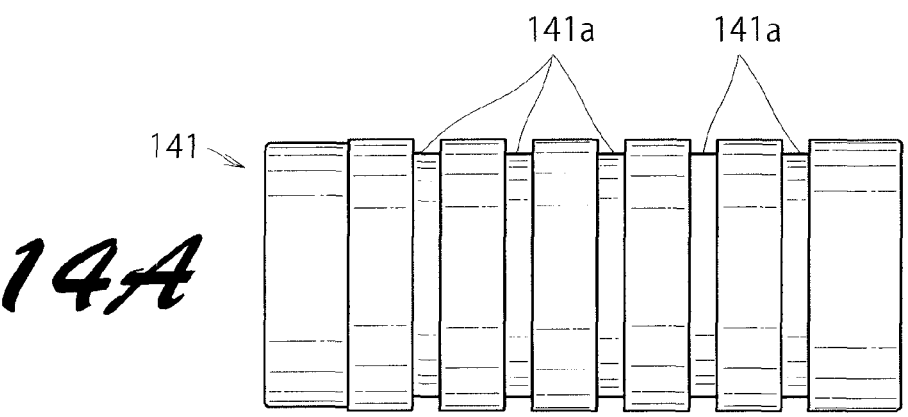
FIGS. 14A and 14B are a plan view and a left side view of a magnetic cylindrical member used in the stator of FIG. 4.
Figure 14B:
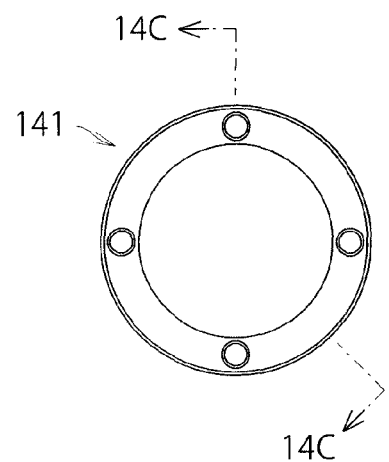
Figure 14C:
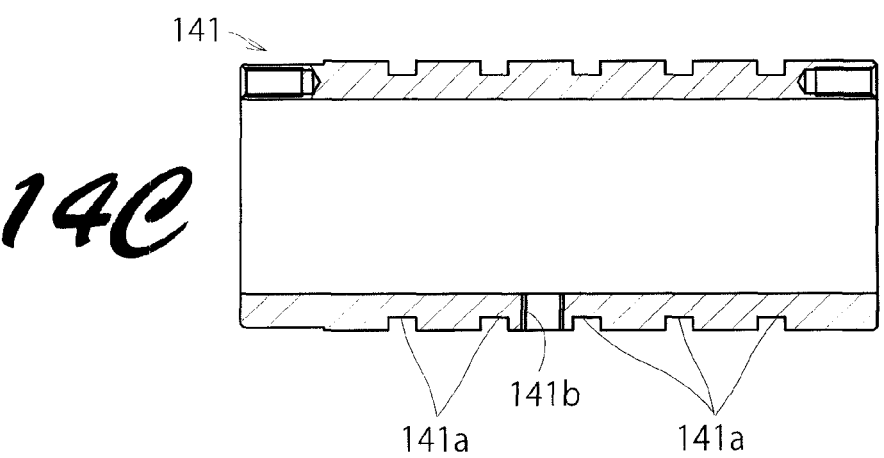
FIG. 14C is a sectional view taken along line C-C of FIG. 14B.

As shown in FIGS. 14A to 14C, the magnetic cylindrical member 141 is integrally made of a magnetic material and has a cylindrical configuration. Five annular fitting groove portions 141a are formed on an outer periphery of the magnetic cylindrical member 141. A grease supply port 141b is formed in the center of the magnetic cylindrical member 141 so as to be positioned between two fitting groove portions 141a. A grease supply nozzle 177 (FIGS. 4 to 6) is attached to the grease supply port 141b. As shown in FIG. 4, both ends of each magnetic cylindrical member 141 in the pair, located on the same axial end as the end annular magnetic pole portion 135, are fitted into the recess portion 155b of the end annular magnetic pole portion 135 and the recess portion 147b of the end bracket 133 respectively. The other end portions of the pair of magnetic cylindrical member 141 pass through the through-holes 167a of the end annular magnetic pole portion 137. A half portion (a portion opposed to the intermediate annular magnetic pole portions 139) of the fitting groove 141a of the magnetic cylindrical member 141 is fitted with the peripheral portion 171b (see FIG. 13) defining the fitting concave portion 171a of each intermediate annular magnetic pole portion 139. As a result, the five intermediate annular magnetic pole portions 139 are fixedly positioned between the pair of magnetic cylindrical members 141. One end of each magnetic cylindrical member 141 in the pair and the end annular magnetic pole portion 135 are fixed to each other by screws 179 illustrated in FIG. 5. The other end of each magnetic cylindrical member 141 in the pair and the end bracket 133 are fixed to each other by screws 181 illustrated in FIG. 6.

Figure 15A:
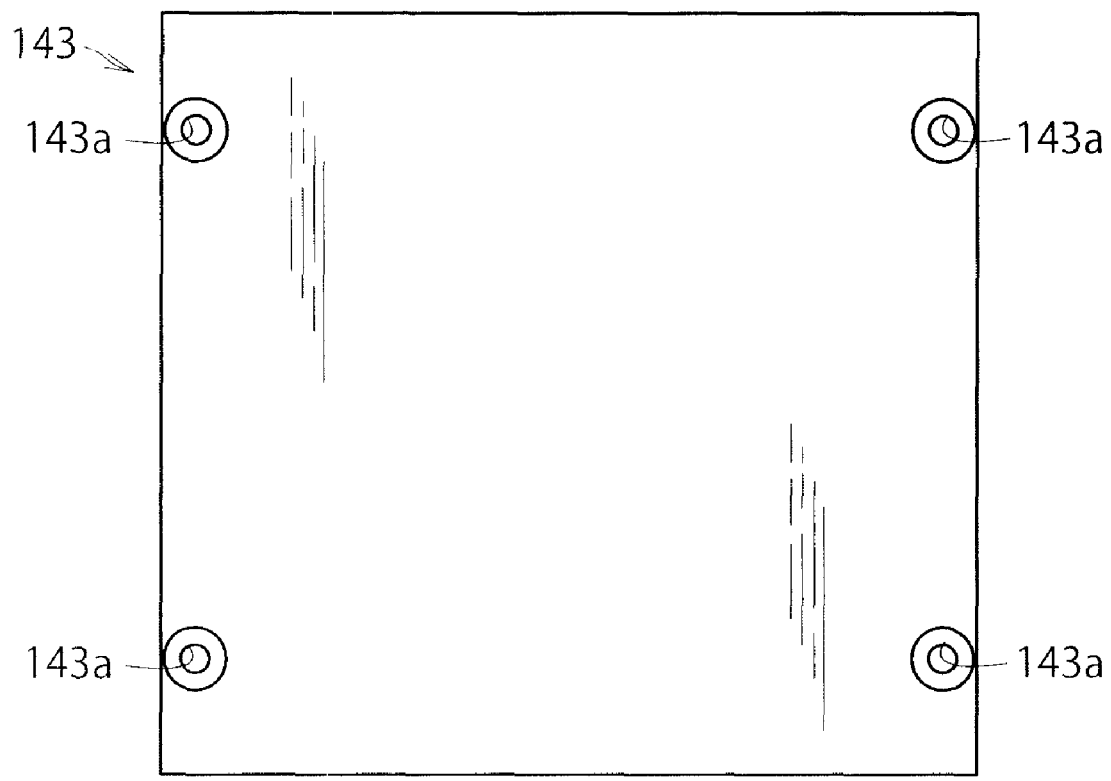
FIGS. 15A and 15B are a plan view and a bottom view of a magnetic conductive plate used in the stator of FIG. 4.
Figure 15B:

The pair of auxiliary connected portions (153b, 165b, 169b) forming the pair of auxiliary connected portion arrays 175 are mechanically and electrically connected to one another by the pair of magnetic conductive plates 143. In other words, the pair of magnetic conductive plates 143 are disposed corresponding to the pair of auxiliary connected portion arrays 175. As shown in FIGS. 15A and 15B, through-holes 143a are formed at four corners of the magnetic conductive plate 143. As shown in FIG. 4, the pair of magnetic conductive plates 143 are screw-fixed by screws 183 passing through the through-holes 143a into screw holes formed in the end annular magnetic pole portion 135 and the end annular magnetic pole portion 137. In the present embodiment, a pair of yoke assemblies are constituted from the pair of magnetic cylindrical members 141, and a pair of auxiliary yoke assemblies are constituted from the pair of magnetic conductive plates 143. As a result, a yoke magnetically connecting the annular magnetic pole portions (135, 139 and 137) is formed of the pair of magnetic cylindrical members 141 and the pair of magnetic conductive plates 143.

With the pairs of end annular magnetic pole portions 135 and 137, the five intermediate annular magnetic pole portions 139, the pair of magnetic cylindrical members 141, the pair of magnetic conductive plates 143 and the six excitation windings 129A to 129F being assembled together, a mold layer 185 made of an one-liquid type thermosetting insulating molding resin is disposed between adjacent two of the annular magnetic pole portions (135, 139 and 137), and is located radially outside of the six excitation windings 129A to 129F. The mold layer 185 is also formed in the resin through-holes 169c of the five intermediate annular magnetic pole portions 139.

As shown in FIGS. 4 and 5, a Hall element 172 is disposed on an outer surface of the one end annular magnetic pole portion 135 of the stator core unit 131. The permanent magnet 74 to be detected is disposed on the direct drive shaft 5 to face the Hall element 172. The Hall element 172 and the permanent magnet 74 to be detected work together to detect magnetic poles.

Figure 18:
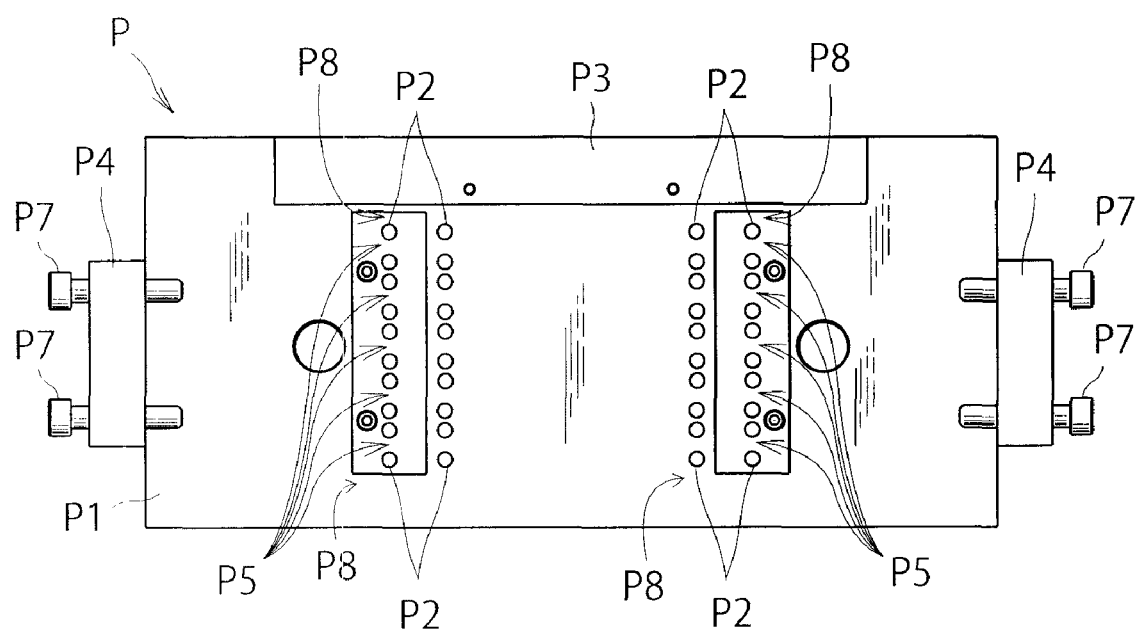
FIG. 18 is a plan view of a positioning jig used for manufacturing the linear synchronous motor of FIG. 4.
Figure 19:
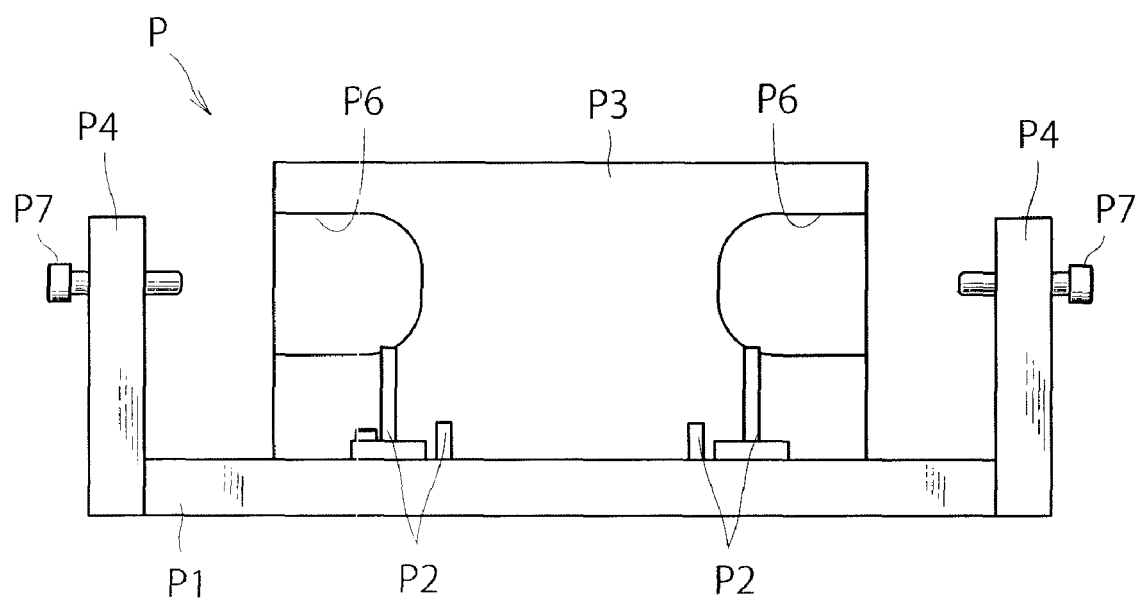
FIG. 19 is a front view of the positioning jig used in manufacturing the linear synchronous motor of FIG. 4.

The stator 103 of the linear synchronous motor according to the embodiment is manufactured as described below. First, a positioning jig P illustrated in FIGS. 18 and 19 is prepared. The positioning jig P includes a base P1, a spacer P2 projecting from the base P1, a first wall portion P3 and a pair of second wall portions P4, the first wall portion P3 and the second wall portions P4 rising from the edge portion of the base P1.

Subsequently, the five intermediate annular magnetic pole portions 139 are each inserted in portions P5 between spacers P2 and the base P1 such that one auxiliary connected portion 169b in the pair may be placed upon the base P1.

Subsequently, the excitation windings 129A to 129F each received in the bobbin 132 are arranged between adjacent two of the intermediate annular magnetic pole portions 139 and on the outer side of the both outermost intermediate annular magnetic pole portions 139 to form a stack. Upon stacking, each pair of excitation windings are connected each other with a contact line C (129A to 129B, 129C to 129D and 129E to 129F). Further, the protruding portion 132d of the bobbin 132 is fitted into the corresponding protruding portion fitting groove 169d of the intermediate annular magnetic pole portion 139 upon the stacking.

Figure 20A:
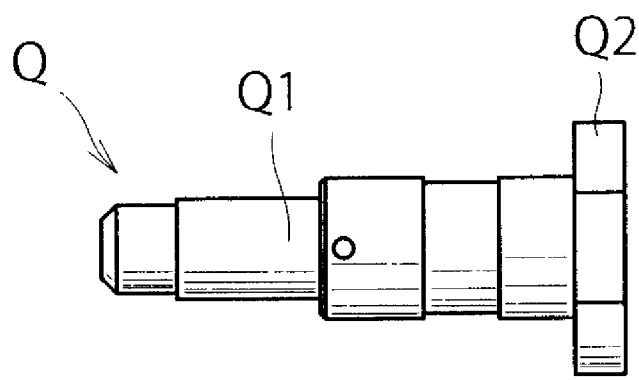
FIGS. 20A and 20B are a front view and a right side view of a centering jig used in manufacturing the linear synchronous motor of FIG. 4.
Figure 20B:
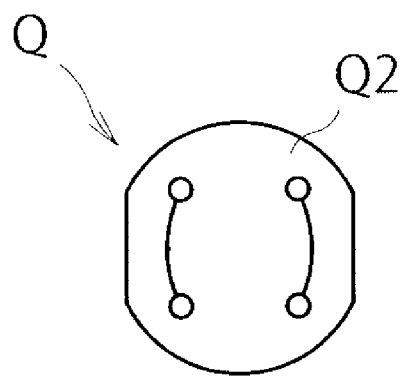

Subsequently, two centering jigs Q illustrated in FIGS. 20A and 20B are prepared. The centering jig Q includes an extended portion Q1 and an engaging portion Q2 located at one end of the extended portion Q1. Then, the extended portion Q1 of one of the centering jigs Q is fitted into a hollow portion of one magnetic cylindrical member 141 in the pair to combine the one centering jig Q and the one magnetic cylindrical member 141 each other.

Subsequently, the engaging portion Q2 of the one centering jig Q combined with the one magnetic cylindrical member 141 is engaged with one of two engaging holes P6 formed in the first wall portion P3, and the peripheral portions 171b defining the fitting concave portions 171a, located on one side, of the five intermediate annular magnetic pole portions 139 are each fitted into the corresponding fitting groove portion 141a of the one magnetic cylindrical member 141 in the pair. As a result, the stack and the one magnetic cylindrical member 141 are connected to each other. Then, the lead wires of the excitation windings 129A to 129F are connected one another as shown in FIG. 7.

Subsequently, the extended portion Q1 of the other centering jig Q is inserted into the hollow portion of the other magnetic cylindrical member 141 in the pair to combine the other centering jig Q with the other magnetic cylindrical member 141. Then, the engaging portion Q2 of the other centering jig Q combined with the other magnetic cylindrical member 141 is engaged with the other engaging hole P6 of the first wall portion P3, and the peripheral portions 171b defining the other fitting concave portions 171a, located on the other side, of the five intermediate annular magnetic pole portions 139 are each fitted into a corresponding fitting groove portion 141a of the other magnetic cylindrical member 141 in the pair. As a result, the stack and the other magnetic cylindrical member 141 are connected to each other. Then, positioning adjustment of the pair of magnetic cylindrical members 141 is carried out by pressing pins P7 of the second wall portions P4 to the pair of magnetic cylindrical members 141 via a plate material etc.

Subsequently, the pair of end annular magnetic pole portions 135 and 137 are disposed on an outer portion P8 of the spacers P2 of the base P1 to mount the pair of end annular magnetic pole portions 135 and 137 onto the pair of magnetic cylindrical members 141. Then, the pair of magnetic conductive plates 143 are attached to the pair of end annular magnetic pole portions 135 and 137. Thus, an assembly is obtained. Then, a core material is inserted into the central through-holes (145a, 151a, etc.) of the assembly, and the centering jig Q is removed from the assembly into which the core material had been inserted. The assembly is then removed from the positioning jig P.

Subsequently, after the assembly has been placed in a mold, an insulating molding resin is pressed into the assembly through an inlet port of the mold. After the insulating molding resin has thermally been cured, the assembly is removed from the mold, followed by removal of the core material. Finally, the end bracket 133 is attached to the pair of magnetic cylindrical members 141. Thus fabrication of the stator 103 is completed.

Alternatively, an assembly may be fabricated by attaching a pair of jig plates instead of attaching the pair of magnetic conductive plates 143. Fitting recesses to be fitted with the annular magnetic pole portions (135, 139 and 137) are formed in the jig plates. In this case, after the insulating molding resin is molded, the pair of jig plates are removed and the pair of magnetic conductive plates 143 may be attached.

According to the linear synchronous motor of the present embodiment, the intermediate annular magnetic pole portions 139 and the magnetic cylindrical members 141 may easily be connected while positioning the intermediate annular magnetic pole portions 139 just by fitting the peripheral portion 171b defining the fitting concave portion 171a of each intermediate annular magnetic pole portion 139 into the corresponding fitting groove 141a of each magnetic cylindrical member 141 in the pair. Thus, manufacturing of linear synchronous motor is simplified.

Figure 16:
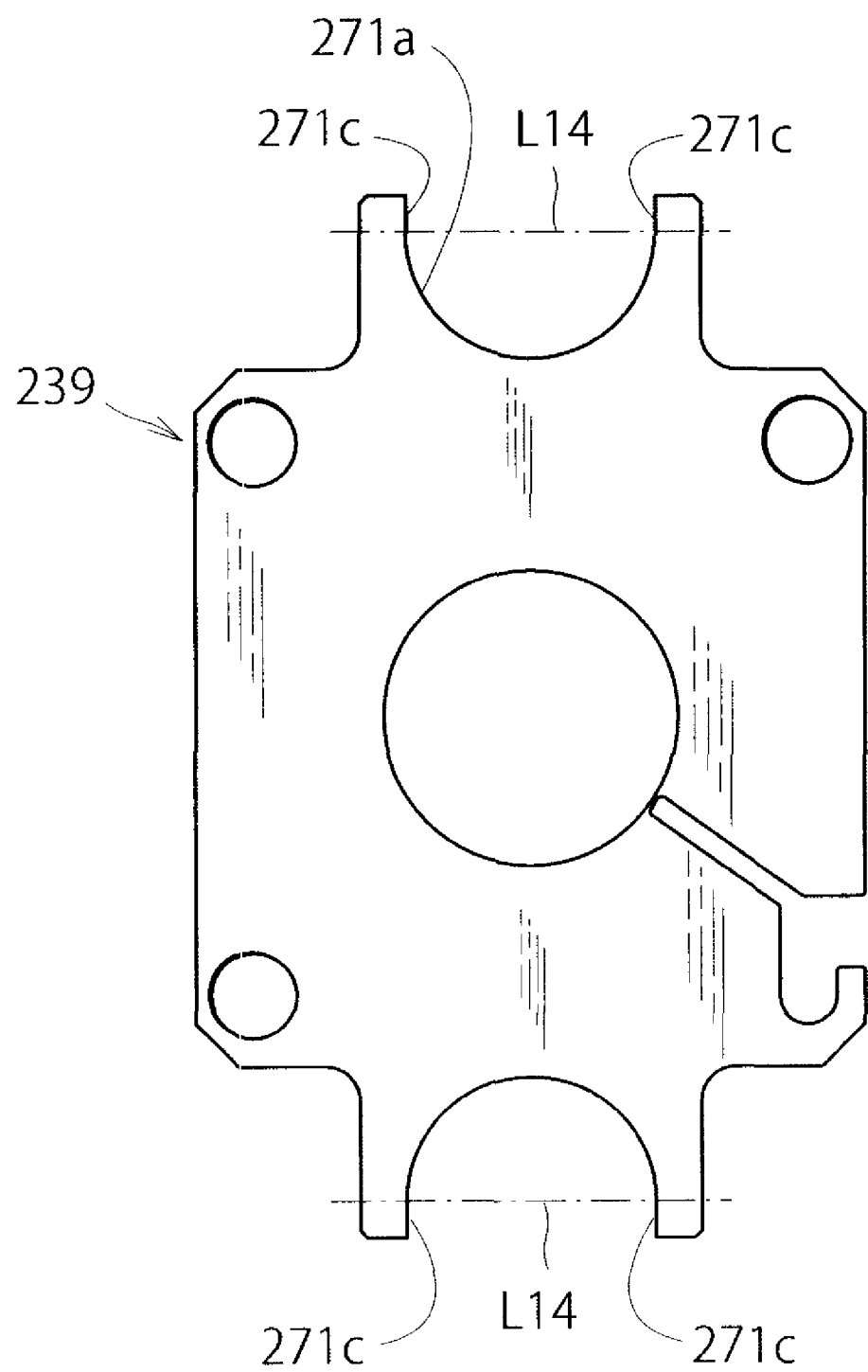
FIG. 16 is a plan view of a modified example of the intermediate annular magnetic pole portion used in the stator of FIG. 4.
Figure 17:
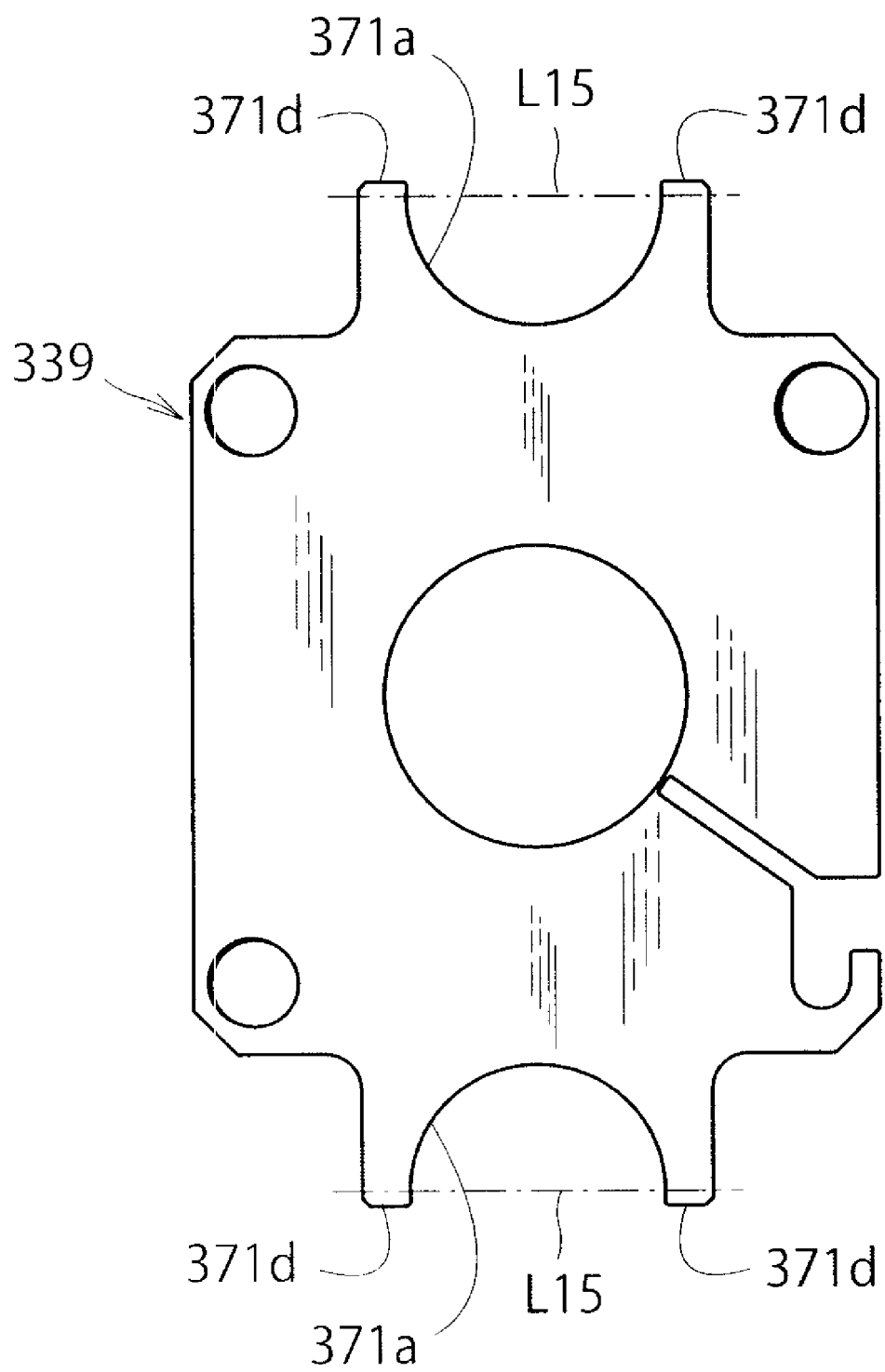
FIG. 17 is a plan view of another modified example of the intermediate annular magnetic pole portion used in the stator of FIG. 4.

According to the above example, the fitting concave portion 171a of the intermediate annular magnetic pole portion 139 has a semicircular shape. However, as shown in FIG. 16, a fitting concave portion 271a of an intermediate annular magnetic pole portion 239 may make an outline of a semicircle plus straight portions 271c extended from both ends of the semicircle. A dashed-dotted line L14 of FIG. 16 is an imaginary line extending rightward and leftward on the paper of FIG. 16 passing through the center of an imaginary circle including the semicircle, which partially defines the fitting concave portion 271a. As shown in FIG. 17, an intermediate annular magnetic pole portion 339 may include a projection 371d at both ends of the semicircular shape of a fitting concave portion 371a. A dashed-dotted line L15 of FIG. 17 is an imaginary line extending rightward and leftward on the paper of FIG. 17 passing through the center of an imaginary circle including the semicircle, which partially defines the fitting concave portion 371a.

Figure 21:
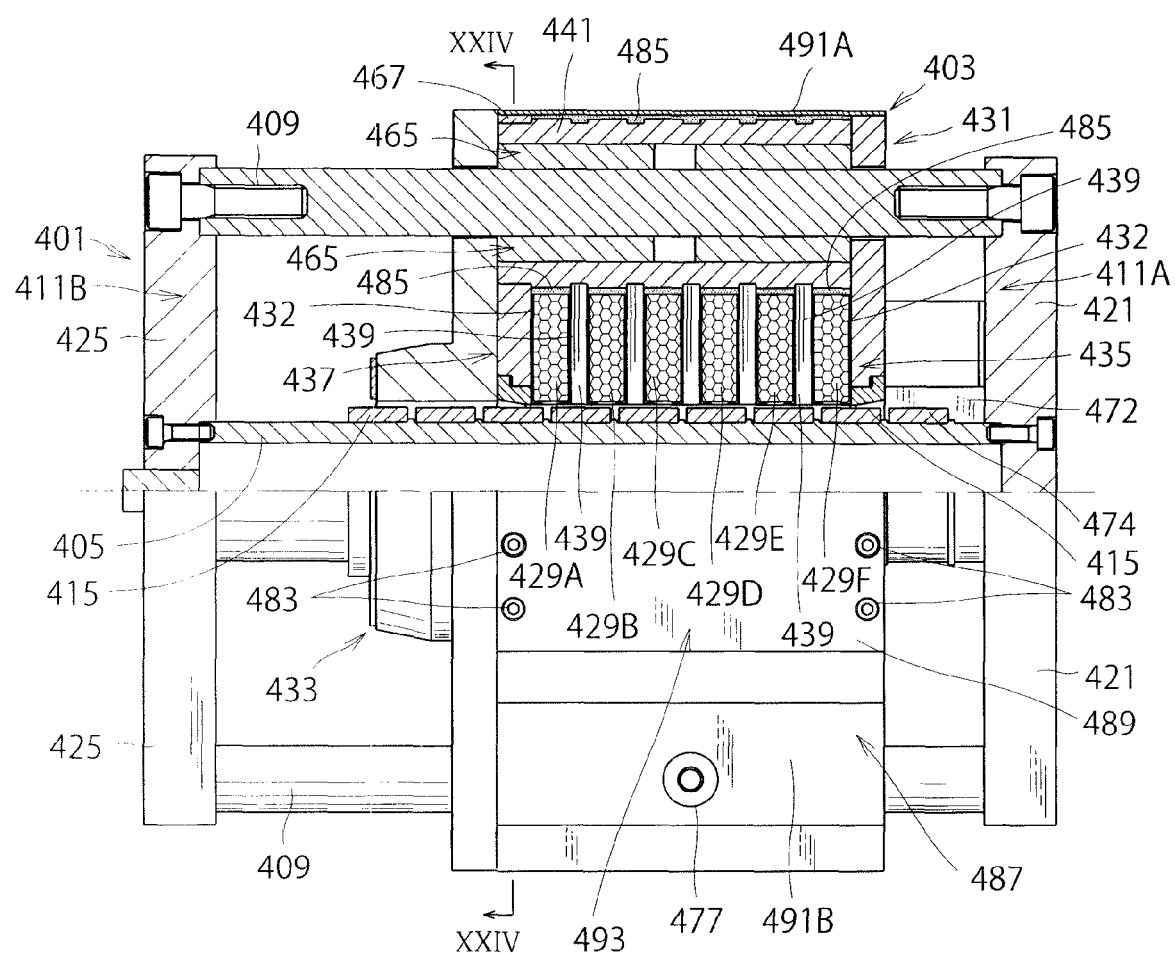
FIG. 21 is a partially cut-away front view of a linear synchronous motor according to another embodiment of the present invention.
Figure 22:
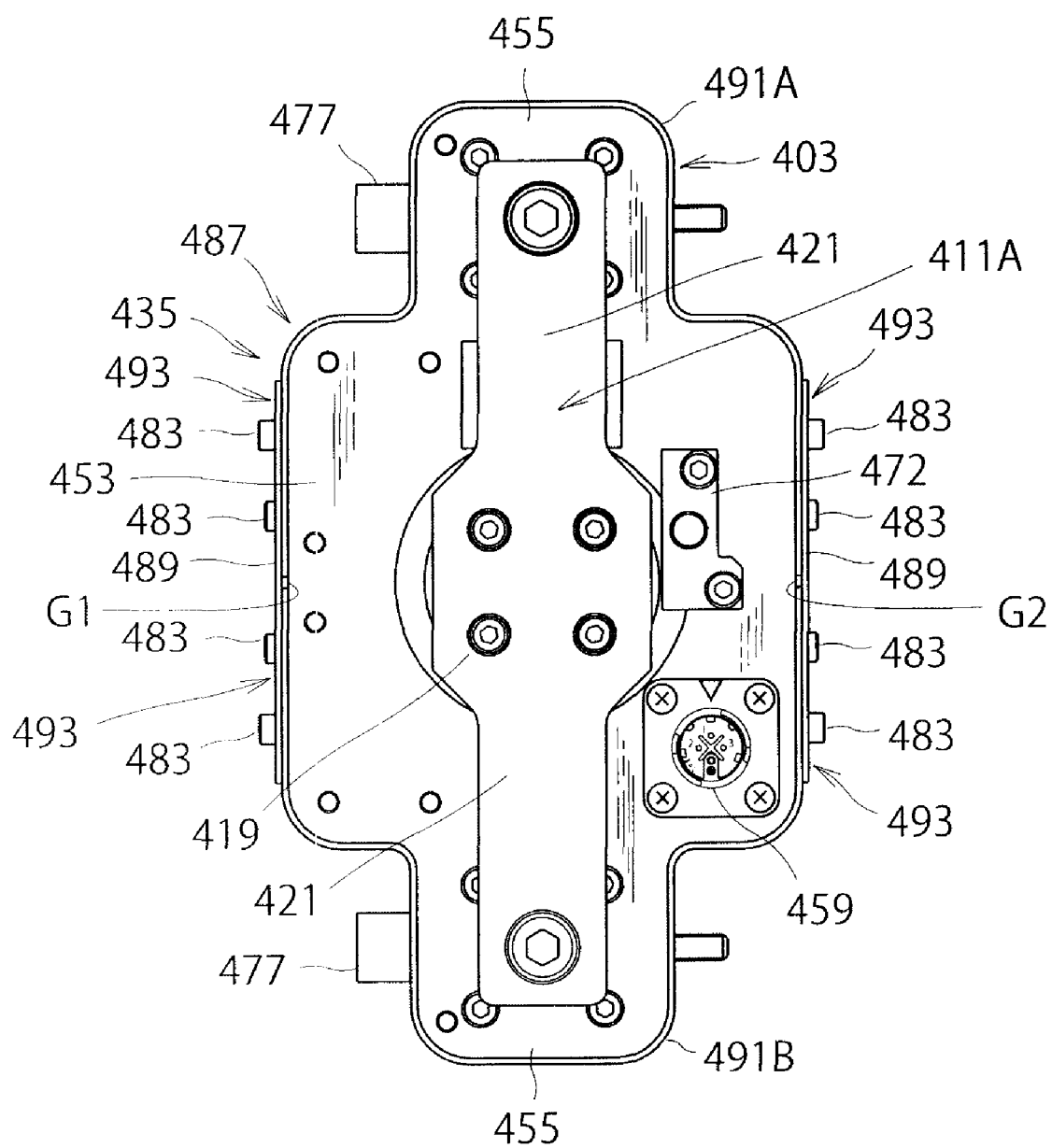
FIG. 22 is a right side view of the linear synchronous motor of FIG. 21.
Figure 23:
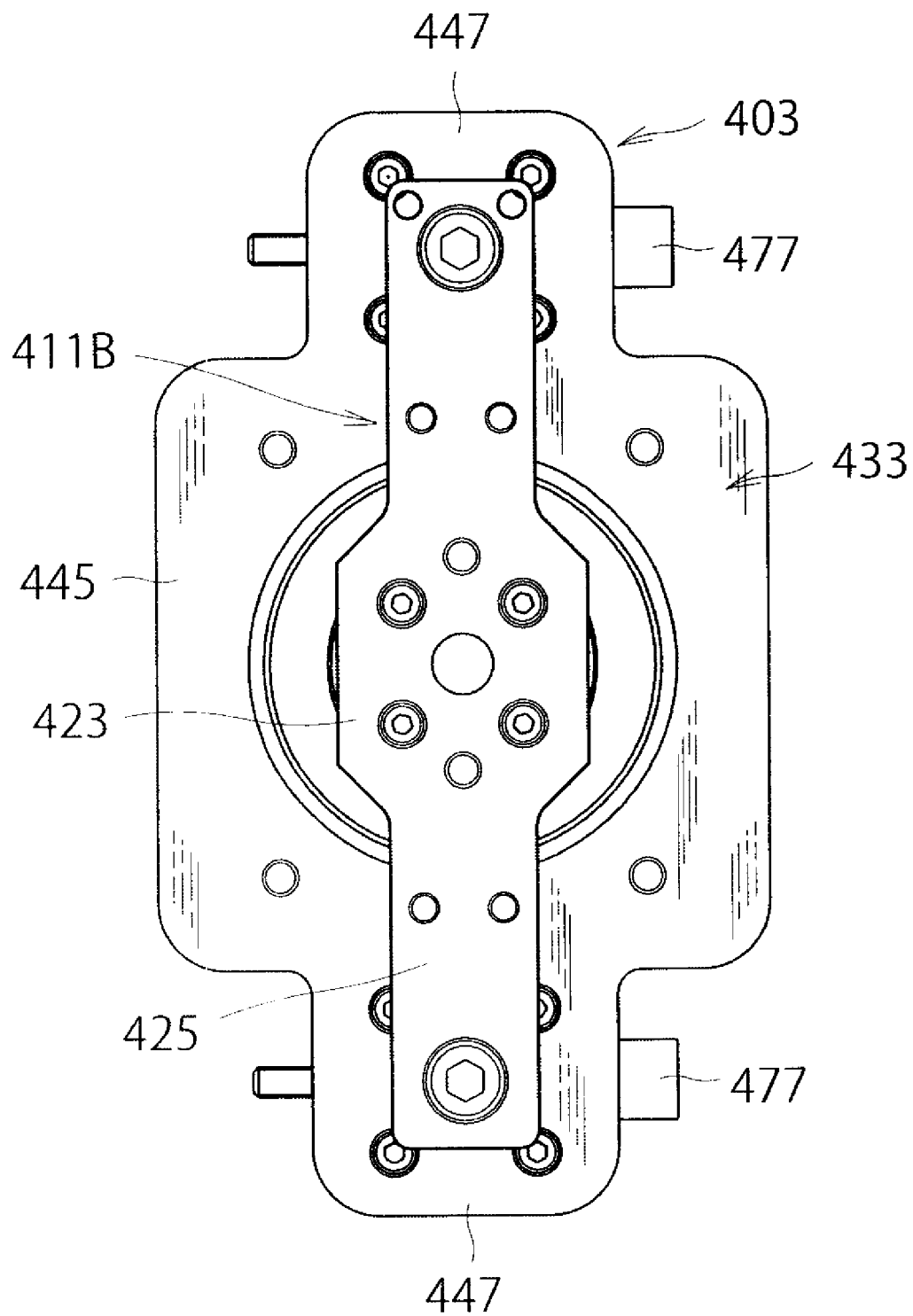
FIG. 23 is a left side view of the linear synchronous motor of FIG. 21.
Figure 24:
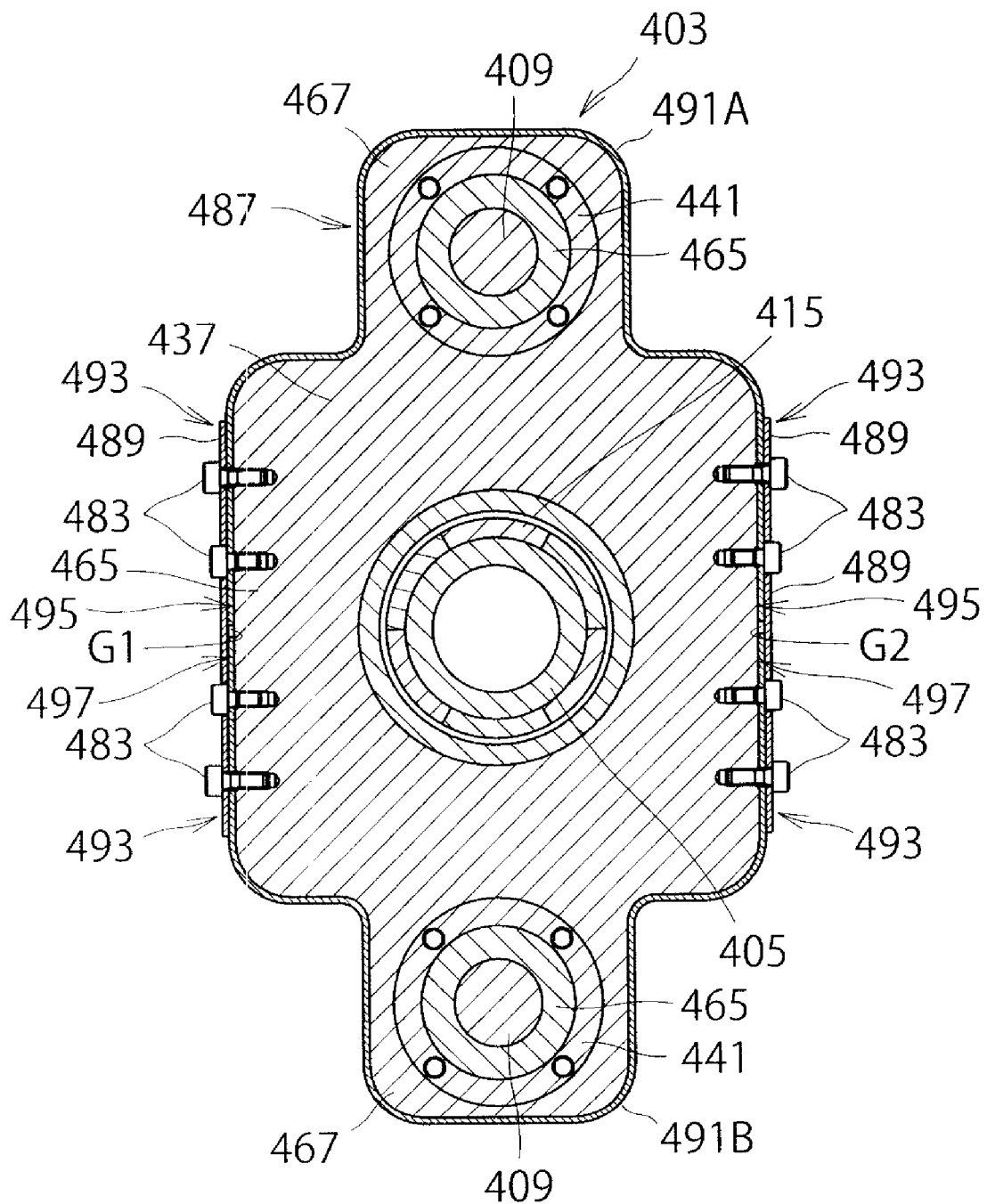
FIG. 24 is a sectional view taken along line XXIV-XXIV of FIG. 21.

FIGS. 21 to 23 are respectively a front view, a right side view and a left side view of a linear synchronous motor according to another embodiment of the present invention. FIG. 24 is a sectional view taken along line XXIV-XXIV of FIG. 21. A mover of the linear synchronous motor of the embodiment is configured substantially similar to that of FIGS. 1 to 3. A stator thereof is configured substantially similar to that of FIGS. 4 to 15 except that the magnetic conductive plate of the stator is different in that it further includes a peripheral wall portion. Accordingly, in the present embodiment, members similar to those of the mover of the linear synchronous motor illustrated in FIGS. 1 to 3 have their reference numerals calculated by adding a number of 400 to the corresponding reference numerals indicated in FIGS. 1 to 3, and descriptions thereof will be omitted. Similarly, members similar to those of the stator of the linear synchronous motor illustrated in FIGS. 4 to 15 have their reference numerals calculated by adding a number of 400 to the corresponding reference numerals indicated in FIGS. 4 to 15, and descriptions thereof will be omitted.

A stator 403 of the present embodiment includes a peripheral wall portion 487 in an outer peripheral portion thereof. As shown in FIG. 24, the peripheral portion 487 is constituted from a first peripheral wall portion constituting member 491A, a second peripheral wall portion constituting member 491B and a connecting structure constituted from a connecting plate 489 and a screw 483. The first and second peripheral wall portion constituting members 491A and 491B are each made of a magnetic conductive material having a thickness of 1.2 mm. The first peripheral wall portion constituting member 491A covers most part of an upper half portion, on each paper of FIGS. 21 to 24, of a stator core unit 431 between a pair of end annular magnetic pole portions 435 and 437, and is in contact with side portions of the pair of end annular magnetic pole portions 435 and 437 and five intermediate annular magnetic pole portions 439. As shown in FIG. 21, according to the embodiment, the first peripheral wall portion constituting member 491A is in contact with the outer peripheral surface of the end annular magnetic pole portions 435 and 437. In this manner, the first peripheral wall portion constituting member 491A magnetically connects the pair of end annular magnetic pole portions 435 and 437 and the five intermediate annular magnetic pole portions 439. The second peripheral wall portion constituting member 491B covers most part of a lower half portion, on each paper of FIGS. 21 to 24, of the stator core unit 431 between the pair of end annular magnetic pole portions 435 and 437 and is in contact with side portions of the pair of end annular magnetic pole portions 435 and 437 and the five intermediate annular magnetic pole portions 439. As shown in FIG. 21, according to the embodiment, the second peripheral wall portion constituting member 491B is in contact with the outer peripheral surface of the end annular magnetic pole portions 435 and 437. In this manner, the second peripheral wall portion constituting member 491B also magnetically connects the pair of end annular magnetic pole portions 435 and 437 and the five intermediate annular magnetic pole portions 439. As shown in FIGS. 22 and 24, a pair of aperture portions G1 and G2 extending in a direction same as a direct drive shaft 405 are formed between the first peripheral wall portion constituting member 491A and the second peripheral wall portion constituting member 491B. The aperture portion G1 in the pair defines an inlet port through which an insulating molding resin is applied upon fabrication of the stator 403. The other aperture portion G2 in the pair defines an air hole used when applying the insulating molding resin.

The pair of connecting plates 489 connect the outer surfaces of the first and second peripheral wall portion constituting members 491A and 491B to cover the pair of aperture portions G1 and G2 respectively. The connecting plates 489 are rectangular in shape, and each has the same thickness of 1.2 mm as the first and second peripheral wall portion constituting members 491A and 491B, and is made of the same magnetic conductive material as the first and second peripheral wall portion constituting members 491A and 491B. The connecting plates 489 are connected to the pair of end annular magnetic pole portions 435 and 437 of the stator core unit 431 by screws 483, together with the first and second peripheral wall portion constituting members 491A and 491B.

With such configuration, the peripheral wall portion 487 constituted from the first and second peripheral wall portion constituting members 491A and 491B and the pair of connecting plates 489 is disposed across the pair of end annular magnetic pole portions 435 and 437 to enclose the five intermediate annular magnetic pole portions 439 and excitation windings 429A to 429F. Mold layers 485 are disposed between adjacent two of the annular magnetic pole portions (435, 439 and 437), and is located radially outside of the six excitation windings 429A to 429F.

Overlapped portions between the first and second peripheral wall portion constituting members 491A and 491B and the pair of connecting plates 489 constitute magnetic conductive portions 493 having an equivalent function of the magnetic conductive plates 143 of the foregoing embodiment. As shown in FIG. 24, the magnetic conductive portion 493 is connected to a plurality of auxiliary connected portions (497 etc.) forming a pair of auxiliary connected portion arrays 495 of the annular magnetic pole portions (435, 437 and 439), to have a function of a yoke. The auxiliary connected portions (497 etc.) are disposed along a direct drive shaft 405 separately from a pair of connected portions (467 etc.) to form the pair of auxiliary connected portion arrays 495.

The stator 403 of the linear synchronous motor of the embodiment may also be manufactured using the positioning jig P illustrated in FIGS. 18 and 19 and the centering jig Q illustrated in FIG. 20 as with the linear synchronous motor of FIGS. 4 to 15.

In the linear synchronous motor of the embodiment, an assembly is constituted from the five intermediate annular magnetic pole portion 439, the excitation windings 429A to 429F each received in a bobbin 432, a pair of magnetic cylindrical member 441, the pair of end annular magnetic pole portions 435 and 437, and the peripheral wall portion 487. Then, after the assembly is placed in a mold, an insulating molding resin is pressed into the assembly through an inlet port of the mold and one aperture portion G1. After the insulating molding resin has thermally been cured, the assembly is taken out from the mold, followed by the removal of a core material. Finally, an end bracket 433 is attached to the pair of magnetic cylindrical members 441 and the pair of connecting plates 489 are attached to the outer surface of the first peripheral wall portion constituting member 491A and the second peripheral wall portion constituting member 491B. Thus, fabrication of the stator 403 has been completed.

According to the linear synchronous motor of the present embodiment, since the molding resin can be applied directly into the first and second peripheral wall portion constituting members 491A and 491B, molding may be simplified. Further, the peripheral wall portion 487 may dissipate heat of the motor. Further, the overlapped portions between the first and second peripheral wall portion constituting members 491A and 491B and the pair of connecting plates 489 may prevent the occurrence of magnetic saturation, and serve as a yoke that magnetically connect the plurality of annular magnetic pole portions (435, 437 and 439).

Figure 25:
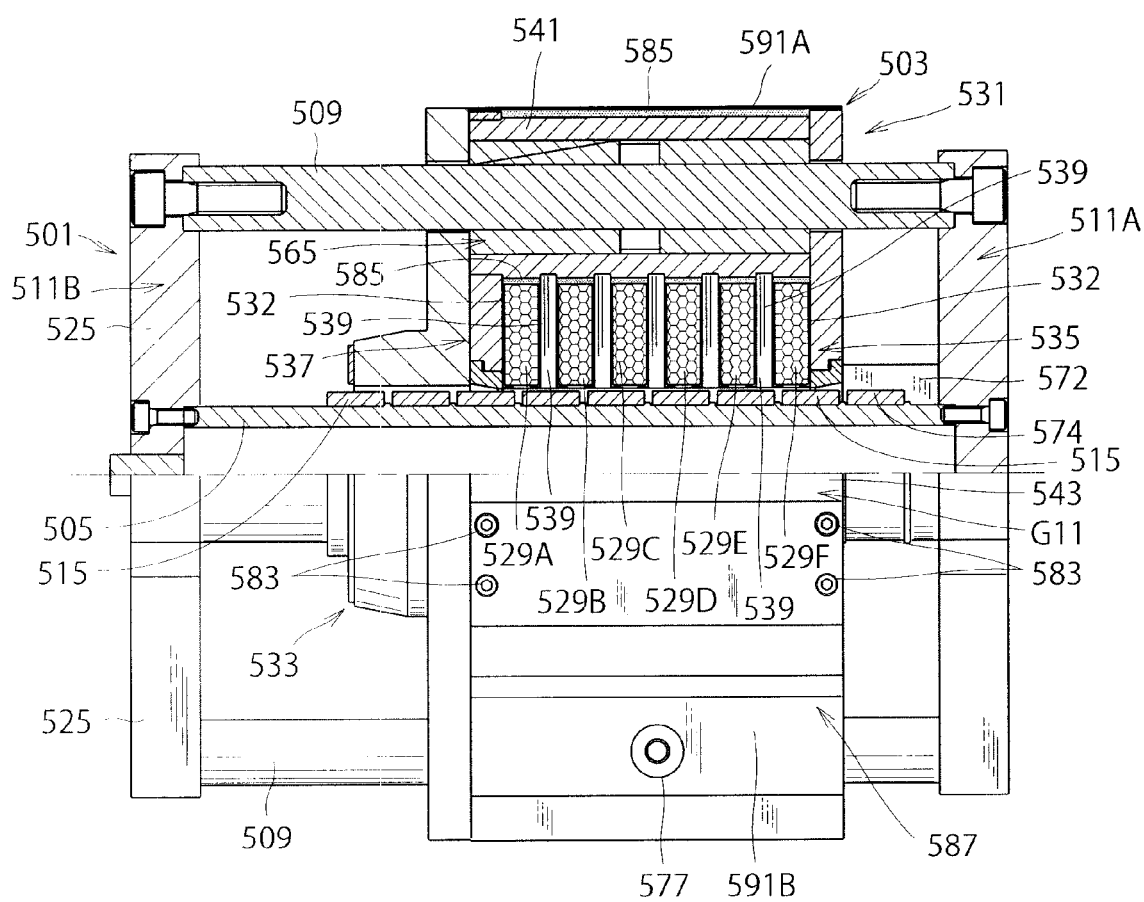
FIG. 25 is a partially cut-away front view of a linear synchronous motor according to still another embodiment of the present invention.
Figure 26:
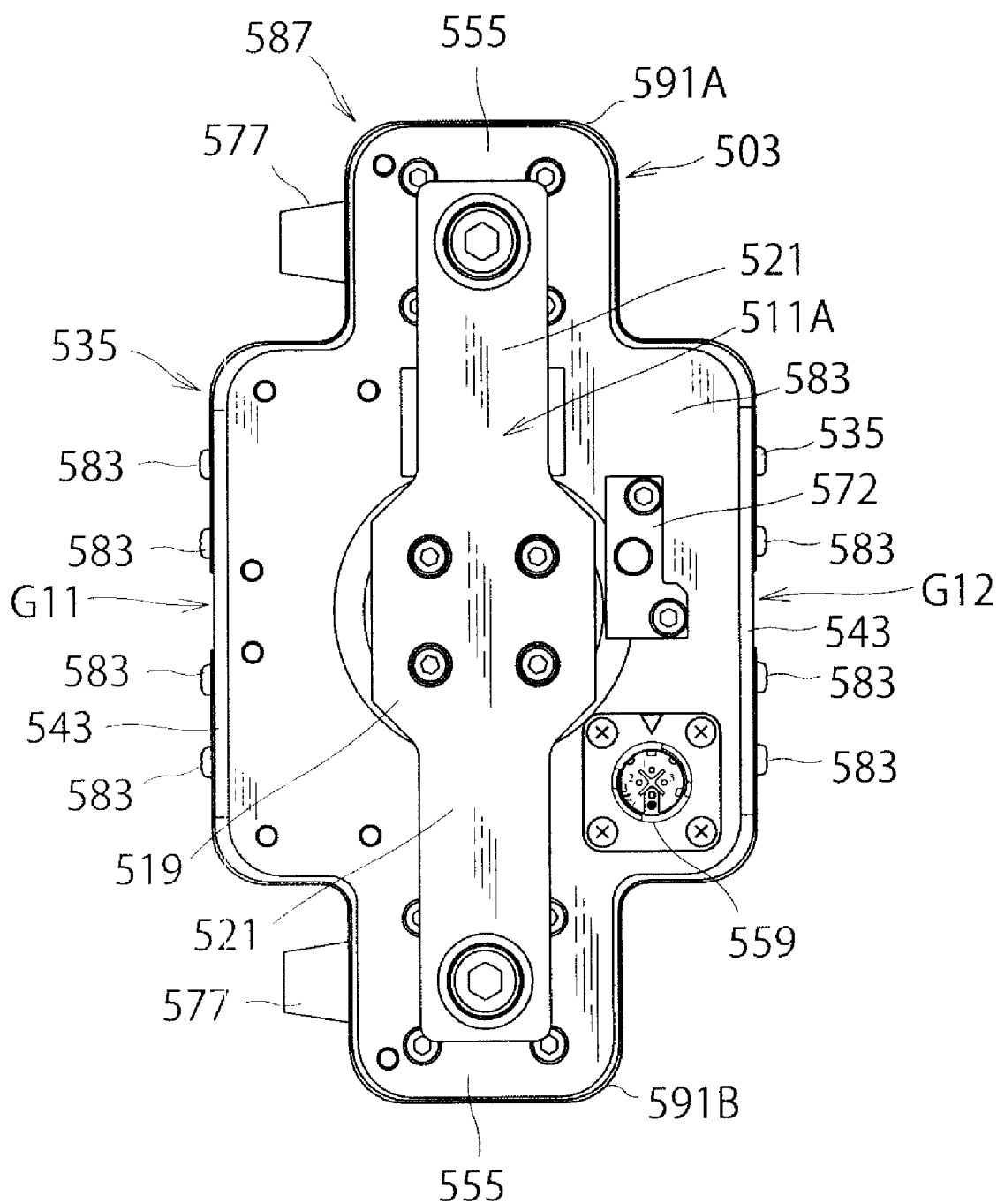
FIG. 26 is a right side view of the linear synchronous motor of FIG. 25.

FIGS. 25 to 27 are respectively a front view, a right side view and a left side view of a linear synchronous motor according to still another embodiment of the present invention. The mover of the linear synchronous motor of the embodiment is configured substantially similar to that of FIGS. 1 to 3. The stator thereof is configured substantially similar to that of FIGS. 4 to 15 except for the difference in configuration of the pair of magnetic cylindrical members (pair of yoke assemblies) and presence of a peripheral wall portion. Accordingly, in the present embodiment, members similar to those of the mover of the linear synchronous motor illustrated in FIGS. 1 to 3 have their reference numerals calculated by adding a number of 500 to the corresponding reference numerals indicated in FIGS. 1 to 3, and descriptions thereof will be omitted. Likewise, members similar to those of the stator of the linear synchronous motor illustrated in FIGS. 4 to 15 have their reference numerals calculated by adding a number of 500 to the corresponding reference numerals indicated in FIGS. 4 to 15, and descriptions thereof will be omitted.

A pair of magnetic cylindrical members 541 (pair of yoke assemblies) of a stator 503 according to the present embodiment include no annular fitting groove portion, and are just in contact with a fitting concave portion 571a of an intermediate annular magnetic pole portion 539 at its outer peripheral portion. The reference numeral 571a is just added for convenience, but is equivalent to that of 171a in FIG. 13. In the linear synchronous motor according to the embodiment, positioning of annular magnetic pole portions 535, 539 and 537 is carried out using a positioning jig P in the fabrication process. How to perform positioning will be described later.

The stator 503 of the present embodiment also includes a peripheral wall portion 587 as with the stator 403 of FIGS. 21 to 24. The peripheral wall portion 587 is constituted from a first peripheral wall portion constituting member 591A and a second peripheral wall portion constituting member 591B. The first and second peripheral wall portion constituting members 591A and 591B are each made of a magnetic conductive material having a thickness of 0.5 mm. The first peripheral wall portion constituting member 591A covers most part of an upper portion, on each paper of FIGS. 25 to 27, of a stator core unit 531 between a pair of end annular magnetic pole portions 535 and 537. The second peripheral wall portion constituting member 591B covers most part of a lower half portion, on each paper of FIGS. 25 to 27, of the stator core unit 531 between the pair of end annular magnetic pole portions 535 and 537. As shown in FIG. 26, a pair of aperture portions G11 and G12 each extending in the same direction as a direct drive shaft 505 are formed between the first peripheral wall portion constituting member 591A and the second peripheral wall portion constituting member 591B. The first and second peripheral wall portion constituting members 591A and 591B are connected to the pair of end annular magnetic pole portions 535 and 537 by means of a connecting mechanism constituted by screws 583, together with a pair of magnetic conductive plates 543 (pair of auxiliary yoke assemblies).

With such configuration, the peripheral wall portion 587 constituted from the first and second peripheral wall portion constituting members 591A and 591B is disposed across the pair of end annular magnetic pole portions 535 and 537, thus enclosing five intermediate annular magnetic pole portions 539 and excitation windings 529A to 529F. A mold layer 585 is disposed between adjacent two of the annular magnetic pole portions (535, 539 and 537), and is located radially outside of the six excitation windings 529A to 529F.

The stator 503 of the linear synchronous motor according to the present embodiment may also be manufactured using the positioning jig P illustrated in FIGS. 18 and 19 and the centering jig Q illustrated in FIG. 20 as with the stator of the linear synchronous motor of FIGS. 4 to 15. In this embodiment, the five intermediate annular magnetic pole portions 539 are disposed on portions P5 provided between the spacers P2 of the base P1 while the pair of end annular magnetic pole portions 535 and 537 are disposed on portions P8 provided in outer sides of the spacers P2 of the base P1. Thus, positioning of annular magnetic pole portions (535, 539 and 537) is carried out. Then an assembly is formed of the five intermediate annular magnetic pole portions 539, the excitation windings 529A to 529F each received in a bobbin 532, the pair of magnetic cylindrical member 541, the pair of end annular magnetic pole portions 535 and 537, and a pair of jig plates having formed therein a recess portion to be fitted with the annular magnetic pole portions (535, 539 and 537). Employment of such jig plates develops more accuracy in positioning of the annular magnetic pole portions (535, 539, and 537). As described above, according to the present embodiment, the assembly is fabricated before neither the first and second peripheral wall portion constituting members 591A and 591B nor the pair of magnetic conductive plates 543 are attached.

Subsequently, after the assembly is placed in a mold, an insulating molding resin is pressed into the assembly through an inlet portion of the mold. Then, after the insulating molding resin has thermally been cured, the assembly is taken out from the mold, followed by the removal of a core material. Next, the pair of jig plates are removed and the pair of magnetic conductive plates 543 are attached, and thereafter an end bracket 533 is attached to the pair of magnetic cylindrical members 541. Finally, the first peripheral wall portion constituting member 591A and the second peripheral wall portion constituting member 591B are attached to the pair of magnetic conductive plates 543. Thus fabrication of the stator 503 is completed.

According to the linear synchronous motor of the present embodiment, since positioning of the annular magnetic pole portions (535, 539 and 537) is carried out using a positioning jig P in the fabrication process, it is not necessary to form an annular fitting groove in the pair of magnetic cylindrical members 541.

Now, the configuration of another invention, which is not claimed, will be described below:

A linear synchronous motor comprising:
  a mover including:
    a direct drive shaft reciprocating in an axial direction, and
    one or more permanent magnet arrays each including a plurality of permanent magnets mounted on the direct drive shaft; and
  a stator including:
    a stator core unit including:
      a plurality of annular magnetic pole portions disposed concentrically with the direct drive shaft to enclose the direct drive shaft and also disposed at an interval in the axial direction, each annular magnetic pole portion having a magnetic pole surface opposed to the permanent magnet arrays of the mover with a predetermined gap therebetween, and
      a yoke magnetically connecting the annular magnetic pole portions; and
    a plurality of excitation windings for exciting the annular magnetic pole portions, wherein
  the annular magnetic pole portions of the stator core unit each have a pair of connected portions facing each other and a pair of auxiliary connected portions facing each other with respective the direct drive shaft, and are arranged such that the pairs of connected portions are disposed along the direct drive shaft to form a pair of connected portion arrays and the pairs of auxiliary connected portions are disposed along the direct drive shaft to form a pair of auxiliary connected portion arrays;
  the yoke is integrally made of a magnetic conductive material and includes a pair of yoke assemblies mechanically and magnetically connecting all of the connected portions of the pairs of connected portion arrays, and a pair of auxiliary yoke assemblies mechanically and magnetically connecting all of the auxiliary connected portions of the pair of auxiliary connected portion arrays;
  the pair of yoke assemblies are constituted from a pair of magnetic cylindrical members that connect the plurality of connected portions forming the pair of connected portion arrays;
  the pair of auxiliary yoke assemblies are constituted from a pair of magnetic conductive plates that connect the plurality of auxiliary connected portions forming the pair of auxiliary connected portion arrays;
  a linear bearing is disposed in each magnetic cylindrical member in the pair;
  a pair of guide shafts are slidably fitted with the pair of magnetic cylindrical members via the linear bearings;
  one end of the direct drive shaft and ends of the pair of guide shafts, located on the same axial end as the one end of the direct drive shaft, are connected to a first connecting member, and the other end of the direct drive shaft and the other ends of the pair of guide shafts, located on the same axial end as the other end of the direct drive shaft, are connected to a second connecting member;

the plurality of annular magnetic pole portions include a pair of end annular magnetic pole portions located at the axial ends and one or more intermediate annular magnetic pole portions located between the pair of end annular magnetic pole portions;

one or more fitting grooves are formed on an outer peripheral surface of each magnetic cylindrical member in the pair at one or more portions facing the one or more intermediate annular magnetic pole portions;

the connected portions of the intermediate annular magnetic pole portions each include a fitting concave portion that is opened in the axial direction and a direction away from the direct drive shaft; and a peripheral portion defining the fitting concave portion of the intermediate annular magnetic pole portion is fitted into the corresponding fitting groove of the magnetic cylindrical member in the pair to fixedly position the one or more intermediate annular magnetic pole portions between the pair of magnetic cylindrical members.

INDUSTRIAL APPLICABILITY

According to the present invention, connected portions of the intermediate annular magnetic pole portion each include a fitting concave portion that is opened in the axial direction and in a direction away from the direct drive shaft, and outer peripheral portions of a pair of yoke assemblies are in contact with the fitting concave portion. Accordingly, the intermediate annular magnetic pole portion and the yoke assembly may be connected easily. As a result, manufacturing of the linear synchronous motor becomes simple. Further, in the linear synchronous motor according to the present invention, a pair of guide shafts connected by a first connecting member and a second connecting member are supported by a pair of linear bearings. As a result, the axial length of the linear synchronous motor may be reduced compared with the prior art.

While certain features of the invention have been described with reference to example embodiments, the description is not intended to be constructed in a limiting sense. Various modifications of the example embodiments, as well as other embodiments of the invention, which are apparent to persons skilled in the art to which the invention pertains are deemed to lie within the spirit and scope of the invention.

What is claimed is:

1. A linear synchronous motor comprising:
   a mover including:
      a direct drive shaft reciprocating in an axial direction, and
      one or more permanent magnet arrays each including a plurality of permanent magnets mounted on the direct drive shaft; and
   a stator including:
      a stator core unit including:
         a plurality of annular magnetic pole portions disposed concentrically with the direct drive shaft to enclose the direct drive shaft and also disposed at an interval in the axial direction, each annular magnetic pole portion having a magnetic pole surface opposed to the permanent magnet arrays of the mover with a predetermined gap therebetween, and
         a yoke magnetically connecting the annular magnetic pole portions; and
      a plurality of excitation windings for exciting the annular magnetic pole portions,
   the annular magnetic pole portions of the stator core unit each having a pair of connected portions, and arranged such that the pairs of connected portions are disposed at a predetermined interval along the direct drive shaft to form a pair of connected portion arrays;
   the annular magnetic pole portions including a pair of end annular magnetic pole portions located at axial ends and one or more intermediate annular magnetic pole portions located between the pair of end annular magnetic pole portions;
   the connected portions of the intermediate annular magnetic pole portions each having formed therein a fitting concave portion that is opened in the axial direction and a direction away from the direct drive shaft; and
   the yoke made of a magnetic conductive material and including a pair of yoke assemblies mechanically and magnetically connecting all of the connected portions of the pairs of connected portion arrays, the pair of yoke assemblies contacting the fitting concave portions at outer peripheral portions thereof.

2. The linear synchronous motor according to claim 1, wherein
   a pair of linear bearings are fixed to the stator core unit to face each other with respect to the direct drive shaft;
   a pair of guide shafts are slidably supported by the linear bearings; and
   one end of the direct drive shaft and ends of the pair of guide shafts located on the same axial end as the one end of the direct drive shaft are connected to a first connecting member, and the other end of the direct drive shaft and the other ends of the pair of guide shafts are connected to a second connecting member.

3. The linear synchronous motor according to claim 2, wherein
   the annular magnetic pole portions each include a pair of auxiliary connected portions disposed along the direct drive shaft to constitute a pair of auxiliary connected portion arrays in addition to the pair of connected portions;
   the stator further includes a pair of magnetic conductive plates disposed corresponding to the pair of auxiliary connected portion arrays; and
   the pair of magnetic conductive plates are connected to the auxiliary connected portions constituting the pair of auxiliary connected portion arrays.

4. The linear synchronous motor according to claim 2, wherein
   the pair of yoke assemblies are constituted from a pair of magnetic cylindrical members that connect the connected portions constituting the pair of connected portion arrays; and
   the linear bearing is disposed in each magnetic cylindrical member in the pair.

5. The linear synchronous motor according to claim 2, wherein
   one or more fitting grooves are formed on an outer peripheral portion of each yoke assembly in the pair at one or more portions facing the one or more intermediate annular magnetic pole portions;
   a peripheral portion defining the fitting concave portion of the intermediate annular magnetic pole portion is fitted into the corresponding fitting groove of the yoke assembly to fixedly position the one or more intermediate annular magnetic pole portions between the pair of yoke assemblies.

6. The linear synchronous motor according to claim 1, wherein
one or more fitting grooves are formed on an outer peripheral portion of each yoke assembly in the pair at one or more portions facing the one or more intermediate annular magnetic pole portions;
a peripheral portion defining the fitting concave portion of the intermediate annular magnetic pole portion is fitted into the corresponding fitting groove of the yoke assembly to fixedly position the one or more intermediate annular magnetic pole portions between the pair of yoke assemblies.

7. The linear synchronous motor according to claim 1, wherein
the stator further includes a peripheral wall portion disposed across the pair of end annular magnetic pole portions to enclose the one or more intermediate annular magnetic pole portions and the plurality of excitation windings; and
a mold layer formed of an insulating molding resin is disposed between adjacent two of the annular magnetic pole portions, and is located radially outside of the excitation windings.

8. The synchronous motor according to claim 7, wherein
the peripheral wall portion includes a plurality of peripheral wall portion constituting members connected by a connecting structure.

9. The linear synchronous motor according to claim 8, wherein
the peripheral wall portion constituting members are each made of a magnetic conductive material;
the peripheral wall portion constituting members are connected by a connecting plate made of a magnetic conductive material; and
the pair of end annular magnetic pole portions and the one or more intermediate annular magnetic pole portions are magnetically connected by means of overlapped portions between the peripheral wall portion constituting members and the connecting plate.

10. The linear synchronous motor according to claim 8, wherein
the connecting structure connects the peripheral wall portion constituting members and the stator core unit with screws.

11. The linear synchronous motor according to claim 1, wherein
the magnetic pole surface of each end annular magnetic pole portion in the pair is sloped such that a gap between the magnetic pole surface and the permanent magnet array becomes larger in the axial direction away from the intermediate annular magnetic pole portion adjacent to the end annular magnetic pole portion.

12. The linear synchronous motor according to claim 11, wherein
the end annular magnetic pole portion includes a magnetic pole body portion and an annular magnetic pole surface constituting portion, the magnetic pole body portion having a through-hole in the center thereof and connected to the pair of yoke assemblies, the annular magnetic pole surface constituting portion including the magnetic pole surface and disposed in the through-hole.

13. The linear synchronous motor according to claim 1, wherein
the fitting concave portion includes at least partially a circular arc-shaped portion.

14. The linear synchronous motor according to claim 1, wherein
the one or more intermediate annular magnetic pole portions are formed by stacking a plurality of magnetic steel plates of a predetermined shape in the axial direction.

15. The linear synchronous motor according to claim 1, wherein
the excitation windings are each received in a bobbin made of an insulating material for insulating the excitation windings and the annular magnetic pole portions; and
the bobbin receiving the excitation winding therein is shaped and dimensioned to be inserted between adjacent two of the intermediate annular magnetic pole portions after the one or more intermediate annular magnetic pole portions have fixedly been positioned.

16. The linear synchronous motor according to claim 15, wherein
the bobbin includes a cylindrical portion through which the direct drive shaft passes in a center portion thereof and a pair of flange portions integrally disposed at both ends of the cylindrical portion and extending in a direction perpendicular to the axial direction;
at least one flange portion in the pair includes a slot portion radially extending to lead out a lead wire of the excitation winding radially outside of the flange portion;
the at least one flange portion in the pair integrally includes a protruding portion protruding in a direction away from the other flange portion in the pair and having formed therein the slot portion; and
the intermediate annular magnetic pole portions each has a through-hole through which the direct drive shaft passes and a protruding portion fitting groove which is fitted with the protruding portion of the bobbin.

17. A method of manufacturing a linear synchronous motor, the linear synchronous motor comprising:
a mover including a direct drive shaft reciprocating in an axial direction and one or more permanent magnet arrays each including a plurality of permanent magnets mounted on the direct drive shaft; and
a stator including a stator core unit and a plurality of excitation windings,
the stator core unit including a plurality of annular magnetic pole portions and a yoke, the annular magnetic pole portions being disposed concentrically with the direct drive shaft to enclose the direct drive shaft and also disposed at an interval in the axial direction, each annular magnetic pole portion having a magnetic pole surface opposed to the permanent magnet arrays of the mover with a predetermined gap therebetween, the yoke magnetically connecting the annular magnetic pole portions; and
the excitation windings exciting the annular magnetic pole portions;
the annular magnetic pole portions of the stator core unit each having a pair of connected portions, and arranged such that the pairs of connected portions are disposed at a predetermined interval along the direct drive shaft to form a pair of connected portion arrays;
the annular magnetic pole portions including a pair of end annular magnetic pole portions located at axial ends and one or more intermediate annular magnetic pole portions located between the pair of end annular magnetic pole portions;
the connected portions of the intermediate annular magnetic pole portions each having formed therein a fitting concave portion that is opened in the axial direction and a direction away from the direct drive shaft; and
the yoke made of a magnetic conductive material and including a pair of yoke assemblies mechanically and magnetically connecting all of the connected portions of the pairs of connected portion arrays, the pair of yoke assemblies contacting the fitting concave portions at outer peripheral portions thereof, the method of manufacturing the linear synchronous motor comprising:

preparing a positioning jig by which the plurality of annular magnetic pole portions are positioned and disposed to form the pair of connected portion arrays, the positioning jig including a base on which the plurality of annular magnetic pole portions are mounted and a spacer projecting from the base for spacing out adjacent two of the annular magnetic pole portions; and combining the plurality of annular magnetic pole portions and the plurality of excitation windings by mounting the annular magnetic pole portions on the base and disposing each of the excitation windings between adjacent two of the annular magnetic pole portions.

* * * * *